(12) United States Patent
Hagen et al.

(10) Patent No.: US 9,690,048 B2
(45) Date of Patent: Jun. 27, 2017

(54) OPTICAL FIBER FIXTURES AND METHODS FOR LASER CLEAVING

(71) Applicant: Domaille Engineering, LLC, Rochester, MN (US)

(72) Inventors: John Hagen, Plainview, MN (US); Greg Schumacher, Plainview, MN (US); James Frazer, Escanaba, MI (US)

(73) Assignee: Domaille Engineering, LLC, Rochester, MN (US)

(*) Notice: Subject to any disclaimer, the term of this patent is extended or adjusted under 35 U.S.C. 154(b) by 22 days.

(21) Appl. No.: 14/828,059

(22) Filed: Aug. 17, 2015

(65) Prior Publication Data

US 2017/0010416 A1 Jan. 12, 2017

Related U.S. Application Data

(60) Provisional application No. 62/189,741, filed on Jul. 7, 2015.

(51) Int. Cl.
*G02B 6/36* (2006.01)
*G02B 6/25* (2006.01)

(52) U.S. Cl.
CPC .............. *G02B 6/25* (2013.01); *G02B 6/3616* (2013.01)

(58) Field of Classification Search
CPC ...... G02B 6/25; G02B 6/2551; G02B 6/3652; G02B 6/3616
See application file for complete search history.

(56) References Cited

U.S. PATENT DOCUMENTS

| | | | |
|---|---|---|---|
| 5,459,564 A | 10/1995 | Chivers et al. |
| 6,244,488 B1 | 6/2001 | Tanaka |
| 6,510,271 B1 | 1/2003 | Beldycki et al. |
| 6,695,191 B1 | 2/2004 | Tabeling et al. |
| 6,774,341 B2 | 8/2004 | Ohta et al. |
| 6,963,687 B2 | 11/2005 | Vergeest et al. |
| 7,025,239 B2 | 4/2006 | Luenow et al. |

(Continued)

OTHER PUBLICATIONS

"DE2503 Fiber Optic Inspection Scope User's Guide," Domaille Engineering, Jan. 2015 (20 pages).

(Continued)

*Primary Examiner* — Thomas A Hollweg
*Assistant Examiner* — Mary A El Shammaa
(74) *Attorney, Agent, or Firm* — Pauly, Devries, Smith & Deffner, LLC

(57) ABSTRACT

A holding system for laser cleaving an optical fiber. The holding system includes a support structure located at least partially within a laser cleaving device. The support structure has an exterior surface with a first aperture formed there through. It also has a holding member including a first surface accessible through the first aperture and a second surface opposite the first surface. The holding member defines a second aperture extending from the first surface to the second surface for receiving a corresponding mounted optical fiber. The system also includes a pivot mechanism pivotally coupling the holding member to the support structure. The holding member is pivotable relative to the support structure and a cutting plane of the laser cleaving device to provide a plurality of cleaving angles between the cutting plane and the optical fiber.

16 Claims, 18 Drawing Sheets

(56) References Cited

U.S. PATENT DOCUMENTS

| | | |
|---|---|---|
| 7,090,414 B2 | 8/2006 | Chau et al. |
| 7,216,512 B2 | 5/2007 | Danley et al. |
| 7,305,169 B2 | 12/2007 | Honma |
| 7,428,365 B1 | 9/2008 | Brinson et al. |
| 7,539,389 B2 | 5/2009 | Brinson et al. |
| 8,340,485 B2 | 12/2012 | Danley et al. |
| 8,881,553 B2 | 11/2014 | Childers et al. |
| 9,008,481 B2 | 4/2015 | Kossat et al. |
| 2004/0047587 A1 | 3/2004 | Osborne et al. |
| 2012/0141082 A1* | 6/2012 | Sawicki .................. G02B 6/25 385/134 |
| 2013/0255055 A1* | 10/2013 | Murgatroyd ............ G02B 6/25 29/419.1 |
| 2016/0124150 A1* | 5/2016 | James ...................... G02B 6/25 29/428 |

OTHER PUBLICATIONS

"LaserCleave—1500," Product Brochure, OpTek Systems, 2015 (1 page).
"LaserCleave—500 MT," Product Brochure, OpTek Systems, 2015 (1 page).
"LaserCleave—500 SC," Product Brochure, OpTek Systems, 2015 (1 page).
"LaserCleave-Simplex," Product Specification Sheet and Webpage, www.opteksystems.co.uk/simplex, OpTek Systems, 2007-2008 (2 pages).
"OptiSaber OS700M Information Sheet," Domaille Engineering, www.domailleengineering.com/optical-fiber-polishing/polishing-machines/optisaber.php, accessed Jun. 28, 2015 (1 page).

* cited by examiner

OPTICAL FIBER FIXTURES AND METHODS FOR LASER CLEAVING

CROSS-REFERENCES

This application claims the benefit of U.S. Provisional Application No. 62/189,741, filed Jul. 7, 2015, the content of which is hereby incorporated by reference in its entirety.

FIELD

This disclosure generally relates to cleaving optical fibers and more particularly relates to laser cleaving optical fibers and fixtures for holding optical fibers during cleaving.

BACKGROUND

A typical fiber-optic cable generally includes concentric layers of protective or supporting material with an optical fiber located at the center of the cable. These fiber-optic cables typically have connectors located on each end to connect them to another fiber-optic cable or to a peripheral device. These connectors are high precision devices which position the fiber-optic cable in line with another fiber-optic cable or to a port on a peripheral device.

In order to properly connect with a port or another cable, the end of the optical fiber within the connector must typically abut the end of the optical fiber in an adjacent cable or port. The finish of the end face of the fibers will typically determine the amount of back reflection at the connection site, thus greatly affecting the ability of the fiber-optic cable to transmit information. The apex offset, protrusion/recession, insertion loss, return loss, and angularity are also integral parameters of a connector's geometry. As such, the end faces of a connector's fiber(s) are usually polished to exacting standards so as to produce a finish with minimal back reflection. For example, it is often necessary to polish the end face of the connector fiber to a precise length, i.e., so the end face of the fiber projects a predetermined amount from a reference point such as a shoulder on the fiber optic connector within a predetermined tolerance. Fiber-optic cables having multiple optical fibers can also be polished to produce a particular finish and geometry.

Another approach for achieving the necessary finish of the end face of the connector and optical fiber therein is to cleave the optical fibers using a mechanical cleaving process or a laser cleaving process. In some cases the cleaving process is an initial step to achieve a rough finish, after which the fiber ends are polished. In some cases, especially with laser cleaving, the cleaving process produces a finish that is adequate without polishing.

In addition to finish and geometry, the angle of the fiber optic end face with respect to the axis of the fiber contributes a significant role in the performance of the fiber cable. Some fiber optic cables are specifically made with an angle to reduce back reflection and have keyed connectors installed so they properly mate with specific fiber cables of the same angle in an opposite direction. The reader should note that fiber cables are made in significant volume both with an angled physical contact (APC) of the end face and with a non-angled ultra-physical contact (UPC) end face.

Laser cleaving devices typically require a user to change the fixture when running a new product type in order to accommodate different types of connectors as well as different end face angles for connectors. The process of swapping an entire fixture is time consuming, requires the user to open up the part of the cleaving device that is accessible to the high power laser, which is a potential safety problem, and can affect quality and consistency based on repeated machine adjustment and re-alignment between changes.

SUMMARY

Embodiments of the invention provide systems and methods related to positioning and cleaving optical fibers with a laser cleaving device. One aspect of the invention includes a holding system for laser cleaving an optical fiber. The holding system includes, among other things, a support structure, a pivot mechanism, and a holding member pivotally coupled to the support structure with the pivot mechanism. The support structure is located at least partially within a laser cleaving device and includes an exterior surface having a first aperture formed there through. The holding member includes a first surface accessible through the first aperture and a second surface opposite the first surface. The holding member also defines a second aperture extending there through from the first surface to the second surface for receiving a corresponding mounted optical fiber. The pivot mechanism pivotally couples the holding member to the support structure and the holding member is thus pivotable relative to the support structure and a cutting plane of the laser cleaving device. Pivoting of the holding member provides a plurality of cleaving angles between the cutting plane and the optical fiber.

Implementations of the holding system for laser cleaving an optical fiber may optionally include one or more of the following features. In some cases the plurality of cleaving angles includes a first cleaving angle that is zero degrees for cleaving a perpendicular end face of the optical fiber and a second cleaving angle other than zero degrees for cleaving an angled end face of the optical fiber. In some cases the second cleaving angle is greater than zero degrees or less than zero degrees. The optical fiber is sometimes mounted within a ferrule having an end face. The optical fiber extends from the end face of the ferrule to the cutting plane, which may optionally define a cut length. In some cases the first cleaving angle provides a cut length with respect to the perpendicular end face that is substantially the same as a cut length provided by the second cleaving angle with respect to the angled end face.

In some cases the fiber holding system also includes an optional pivot catch assembly. The pivot catch assembly includes a first part provided by the support structure and a second part provided by the holding member. A first engagement of the first and second parts corresponds to a first cleaving angle and a second engagement of the first and the second parts corresponds to a second cleaving angle. In some cases one of the first and the second parts includes recesses and the other one of the first and the second parts includes spring-loaded elements for engaging the recesses. Some implementations involve the optical fiber being mounted within a ferrule corresponding to the second aperture. The ferrule has an end face from which an end of the optical fiber extends. The second aperture is configured to receive the ferrule with the ferrule extending past the second surface of the holding member to position the end face of the ferrule proximate the cutting plane.

Some implementations of the fiber holding system include a stop member configured to stop movement of the ferrule into the cutting plane. The stop member can include a stop surface located between the cutting plane and the second surface of the holding member. A laser output of the laser cleaving device generates the cutting plane. In some cases the stop member optionally includes a blocking portion that extends from the stop surface toward the holding member and between the ferrule and the laser output. In some implementations, the stop member includes a first stop surface and a second stop surface that engage the end face of the ferrule on opposite sides of the optical fiber.

In some cases the laser cleaving device includes a laser output that generates the cutting plane. The stop member can include a first extension member that provides the first stop surface and a second extension member that provides the second stop surface. Each of the first and the second extension members includes first ends proximal to the laser output and second ends distal to the laser output. The first extension member optionally angles away from the ferrule from the first end of the first extension member to the second end of the first extension member. The second extension member optionally angles away from the ferrule from the first end of the second extension member to the second end of the second extension member.

In some implementations, the end face of the ferrule is perpendicular to an axis of the optical fiber. One optional feature involves the stop member allowing complete loading of the ferrule within the second aperture at a first cleaving angle and stopping the ferrule from being completely loaded within the second aperture at a second cleaving angle. In some cases at least one cleaving angle is greater than zero degrees or less than zero degrees and the end face of the ferrule includes an angled surface corresponding to the at least one cleaving angle. The stop member allows complete loading of the ferrule within the second aperture at the at least one cleaving angle if the ferrule is loaded with the angled surface parallel to the cutting plane. The stop member stops the ferrule from being completely loaded within the second aperture at the at least one cleaving angle if the ferrule is loaded with the angled surface not parallel to the cutting plane.

In some implementations, the support structure includes a mounting portion fastened within the laser cleaving device, and the support structure can be unfastened to remove the holding system from the laser cleaving device.

Another general aspect of the invention includes an optical fiber fixture for use with a laser cleaving device. The optical fiber fixture includes a fixture body including a frame portion and a mounting portion for mounting the fixture body within a laser cleaving device. The laser cleaving device includes a housing and a cutting plane. The frame portion defines a first aperture, the mounting portion defines a void adjacent to the first aperture, and the mounting portion is removably mountable within the housing to make the frame portion accessible through an opening in the housing and to locate the cutting plane within the void.

The optical fiber fixture also includes a holding member pivotally coupled to the fixture body within the void. The holding member includes a first surface accessible through the first aperture and a second surface opposite the first surface. The holding member defines a second aperture extending there through from the first surface to the second surface for receiving and positioning a corresponding mounted optical fiber relative to the cutting plane. The holding member is pivotable relative to the fixture body and the cutting plane to provide a plurality of cleaving angles between the cutting plane and the optical fiber. The plurality of cleaving angles include at least a first cleaving angle that is zero degrees and a second cleaving angle that is a non-zero cleaving angle.

Implementations of the optical fiber fixture may optionally include one or more of the following features. In some cases the plurality of cleaving angles includes multiple discrete cleaving angles. Sometimes the optical fiber fixture also includes a pivot catch assembly including a first part provided by the fixture body and a second part provided by the holding member. The first part and the second part include multiple engagement configurations corresponding to the multiple discrete cleaving angles. In some cases one of the first and the second parts of the pivot catch assembly includes recesses and the other one of the first and the second parts includes spring-loaded elements for engaging the recesses.

The optical fiber fixture may sometimes include a stop member attached to the fixture body for stopping movement of the ferrule into the cutting plane. In some cases the stop member includes an extension member extending through the cutting plane toward the second surface of the holding member. The extension member includes a stop surface located between the cutting plane and the second surface of the holding member.

In some cases the stop member allows complete loading of a ferrule within the second aperture at the first cleaving angle if the end face of the ferrule is perpendicular to an axis of the optical fiber. In this case, the stop member stops the ferrule from being completely loaded within the second aperture at the second cleaving angle.

One general aspect includes a method for cleaving an optical fiber. The method includes providing a laser cleaving device, providing a holding system, tilting a holding member, loading an optical fiber, and cutting the optical fiber with the laser of the cleaving device. The laser cleaving device includes a housing and a laser mounted within the housing for cleaving the optical fiber along the cutting plane. The holding system includes a support structure and a holding member pivotally coupled to the support structure. The holding member includes a first surface accessible through an opening in the housing. The surface defines an aperture extending from the first surface to a second surface of the holding member. Tilting the holding member also involves tilting the aperture to one of a plurality of cleaving angles provided by the holding system.

Implementations may include one or more of the following features. For example, in some cases the optical fiber is a first optical fiber mounted within a ferrule having a perpendicular end face, and a first cleaving angle is zero degrees. In some cases the method involves removing the first optical fiber from the aperture after cutting the optical fiber with the laser and then tilting the holding member to a second cleaving angle different than zero degrees. Optionally, the method may include providing a second optical fiber mounted within a ferrule having an angled end face. The second optical is loaded into the aperture after removing the first optical fiber and then cut with the laser.

In some cases the optical fiber is mounted in a ferrule having a perpendicular end face and the method involves incorrectly loading the optical fiber into the aperture after tilting the holding member to a non-zero cleaving angle. In this case, the method further includes stopping the incorrect loading of the optical fiber into the aperture before the perpendicular end face of the ferrule crosses the cutting plane.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1A:
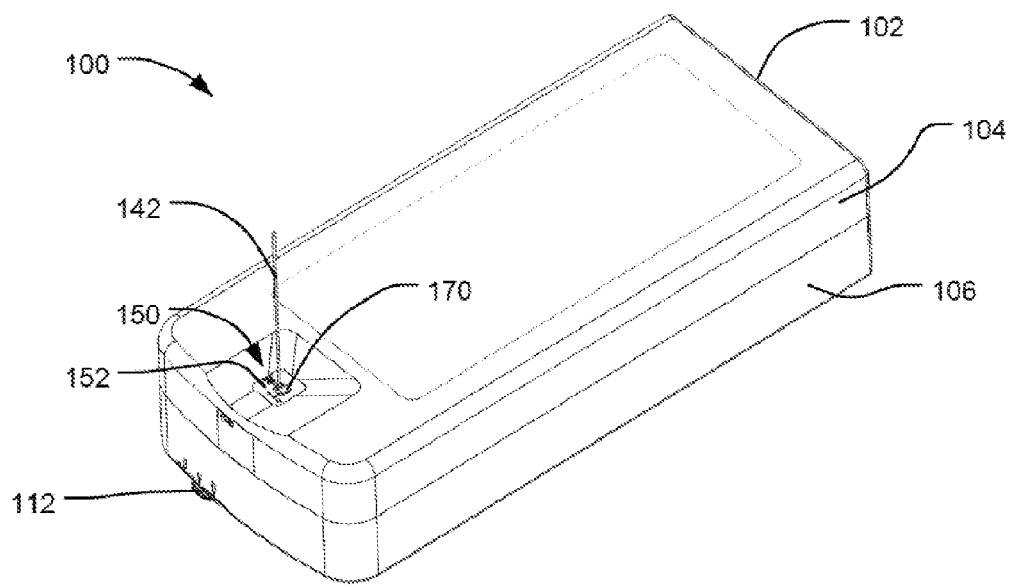
FIG. 1A is a perspective view of an optical fiber laser cleaving device including an optical fiber holding system.
Figure 1B:
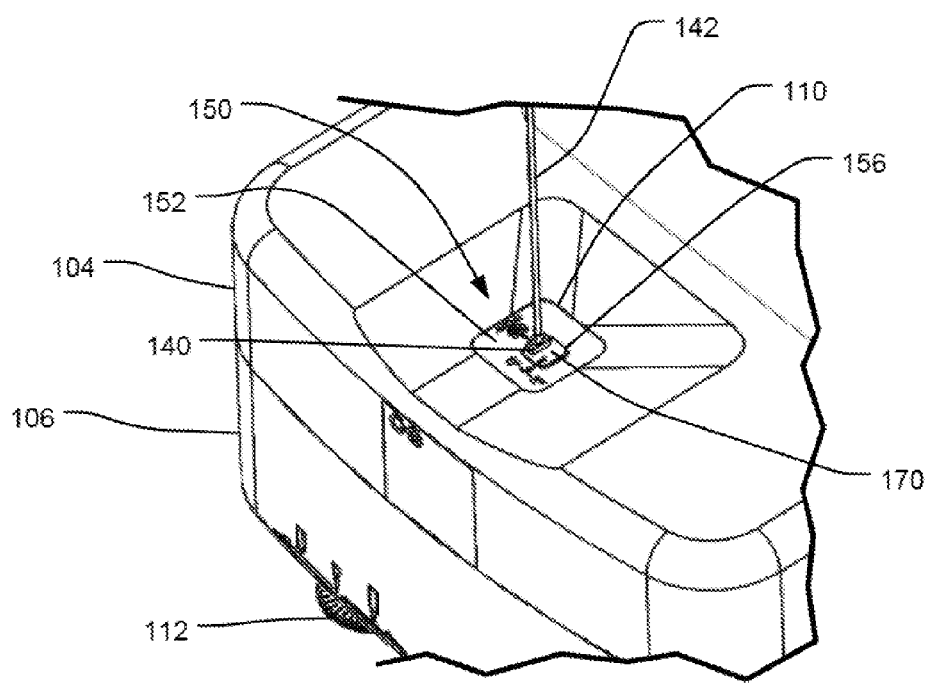
FIG. 1B is an enlarged view of the optical fiber holding system as depicted in FIG. 1A.

FIG. 1A is a perspective view of an optical fiber laser cleaving device 100 that includes an optical fiber holding system 150 according to an implementation of the invention. FIG. 1B is a view of part of FIG. 1A showing portions of the holding system 150 in enlarged detail. The laser cleaving device 100 has a housing 102 that contains a laser cutting system for cleaving optical fibers. The holding system 150 is generally configured to hold and position one or more optical fibers with respect to the laser cutting system to facilitate desired fiber cutting and cleaving.

One aspect of the fiber holding system 150 that will be described in detail hereinafter involves a tilt-adjustable holding member 170 that can be pivoted relative to the laser cutting plane of the cleaving device 100. The ability of the holding member 170 to tilt or pivot with respect to the cutting plane enables a technician to adjust the holding member 170 for more than one cleaving angle, which in turn means that the optical fiber holding system 150 can be used to cleave more than one type of fiber and/or fiber/ferrule configuration. One practical implementation involves configuring the holding system 150 to work with both perpendicular end face configurations and angled end face configurations.

The embodiments of the invention can be useful for holding, positioning, and cleaving a wide variety of optical fibers and/or fiber/ferrule configurations. FIGS. 1A-1B illustrate one possible implementation in which the holding system 150 is holding an MT-type fiber ferrule 140 connected to a multi-fiber ribbon cable 142. For simplicity, various aspects, implementations, and optional features are described and illustrated herein using the example of the MT ferrule 140 and the fiber ribbon 142 shown in FIGS. 1A-1B. Even so, it should be appreciated that embodiments of the invention are not limited to any particular configuration of fibers, ferrules, connectors, and/or cables. On the contrary, it is contemplated that the teachings herein are applicable to virtually any type of optical fiber connector/ferrule/fiber adaptable for laser cleaving. Examples include, but are not limited to, multi-fiber ferrules and cables, single fiber connectors and cables, single and multimode fibers, connectorized fibers, and bare fibers. The fiber holding system can also be implemented to receive and hold optical fiber connectors having other form factors. Examples include, but are not limited to, fiber connector types such as SC, LC, SMA, and FC types.

For simplicity, the term "optical fiber" is used herein to refer to single optical fibers, and also used as shorthand to refer to one optical fiber within a group of optical fibers. As one example, the description herein at times refers to the multi-fiber ribbon cable 142 as "the optical fiber" for convenience. Similarly, at times the disclosure refers to "the optical fiber" extending from the end face of a multi-fiber ferrule when there are additional fibers extending from the ferrule as well. Such references are used for convenience, and can be considered to refer to one of the multiple optical fibers present in such cases. Such references are also a reminder of the general applicability of the invention to just one optical fiber or to just one connector and/or ferrule with a single fiber.

In addition, at times an optical fiber may be referred to herein as "mounted" or "unmounted." In some cases the disclosure may refer to bare fibers, e.g., fibers that are not mounted within a ferrule or other structure, as "unmounted." Further, in some cases a fiber that is fixed or mounted within a ferrule may be referred to as "mounted." The term "mounted optical fiber" can also refer to a fiber that is mounted within some other type of structure. As just one example, in some cases one or more bare fibers may be loaded within a mounting structure apart from a ferrule for cleaving. It is contemplated that such mounting structures would removably hold the fiber(s) for cleaving, and be loadable within a holding member such as the tilt-adjustable holding member 170 shown in FIGS. 1A-1B.

Returning to FIGS. 1A-1B, in this example the housing 102 of the laser cleaving device 100 is optionally formed from a top portion 104 fastened together with a bottom portion 106. The top portion 104 of the housing includes an opening 110 that is configured for accessing the fiber holding member 170. In this example the opening 110 is shown with a rounded, square configuration, which corresponds to the shape of the accessible portion of the holding member 170. The size and/or shape of the opening 110 may optionally vary in other implementations depending, for example, upon the type of optical fiber and/or mounting that is supported by the fiber holding member 170.

Continuing with reference to FIG. 1B, the optical fiber holding system 150 includes support structure having an exterior surface 152 that fits within and is accessible through the opening 110 in the housing 102 of the cleaving device. In this implementation, the support structure and holding member 170 of the fiber holding system 150 are partially located within the housing 102 of the laser cleaving device 100. The exterior surface 152 of the support structure is accessible through the opening 110 in the cleaver housing 102. The fiber holding member 170 is mounted within an aperture 156 defined in the exterior surface 152 of the support structure. According to one aspect of the invention, the holding member 170 is pivotally mounted to the support structure, as will be discussed in greater detail hereinafter. The holding member 170 defines another aperture that receives the mounted optical fiber 142, enabling precise positioning of the optical fiber 142 relative to the laser cutting system within the housing 102.

FIGS. 1A-1B additionally illustrate an optional adjustment mechanism that can be used to adjust the cleaving laser cutting plane with respect to the position of one or more of the mounted optical fibers 142, the holding member 170, and/or the entire fiber holding system 150, within the device 100. The implementation of the adjustment mechanism shown in FIGS. 1A-1B includes a thumb wheel 112 that can be used to finely adjust the position of the laser cutting plane when cleaving one or more fibers. As just one example, in some cases the optional adjustment mechanism provides height and/or vertical adjustment of the laser cutting plane relative to the fiber holding member 170.

Figure 1C:
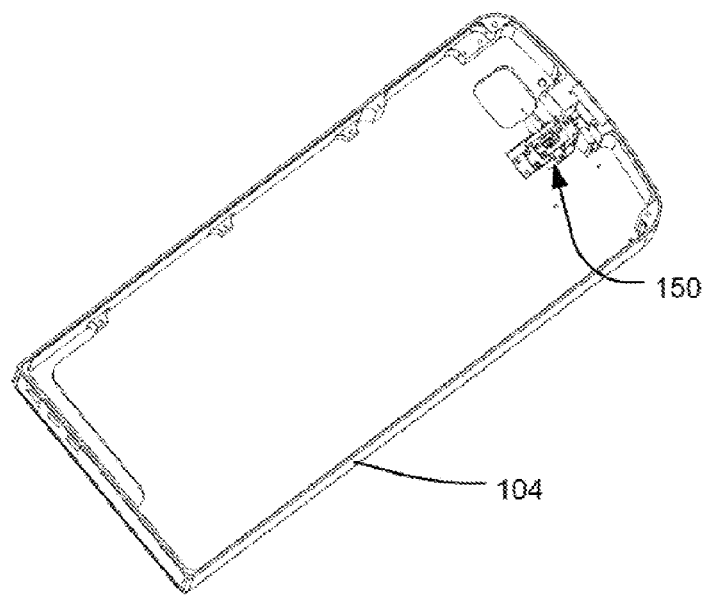
FIG. 1C is a bottom perspective view of the laser cleaving device of FIG. 1A with a bottom housing portion removed.
Figure 1D:
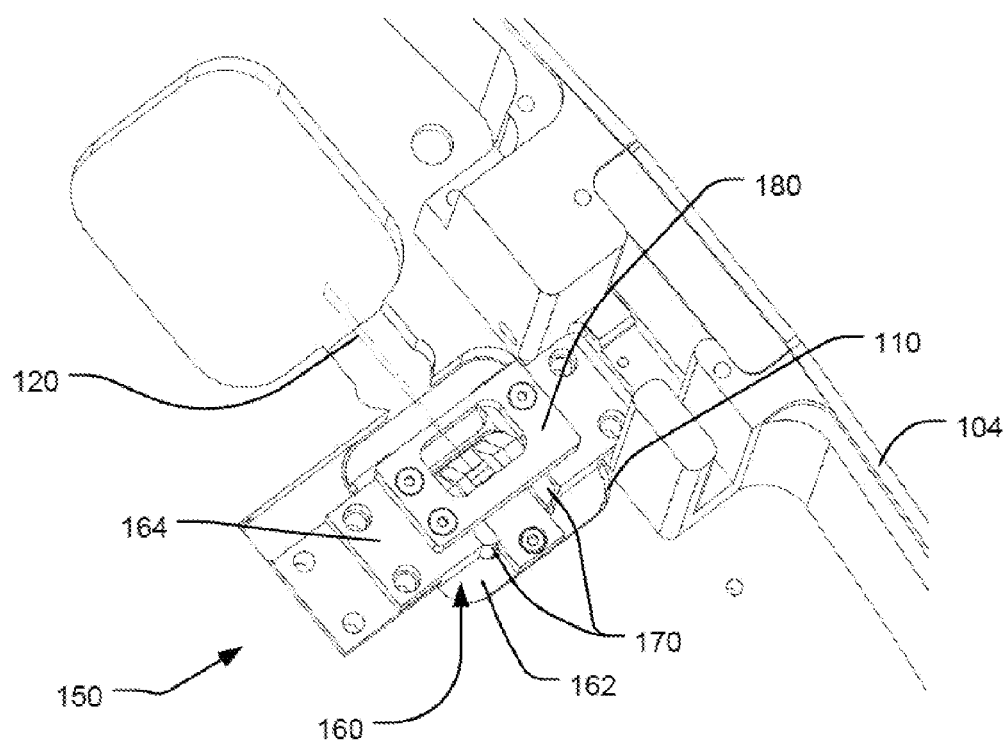
FIG. 1D is an enlarged view of the laser cleaving device of FIG. 1C showing a portion of the optical fiber holding system.

Turning to FIGS. 1C and 1D, a perspective view of the inside of the top housing portion 104 is shown with the bottom housing portion 106 removed. In general, the laser cleaving device 100 typically includes control circuitry and a laser cutting system supplied by a high power laser module. The output of the laser module is directed toward the one or more optical fibers being cleaved using an optical system. For example, directing the laser output can sometimes include using one or more actuators that move one or more optical components. Most of the internal components of the laser cleaving device 100 are omitted from FIGS. 1C-1D for simplicity and to allow greater focus on the fiber holding system 150. Referring to FIG. 1D, the laser output 120 of a laser cutting system is represented by dashed lines and shown focusing to a point near the fiber holding system 150 and one or more optical fibers held therein. In one implementation the laser output 120 is directed through a lens on the way to the optical fiber. As the laser output 120 is swept back and forth across the width of the lens, the lens redirects the continuously moving laser output toward the fiber holding system 150 along a planar path. The planar path of cumulative laser output corresponds to the laser cutting plane used to cleave the optical fiber(s) held by the fiber holding system 150.

While some of the teachings disclosed herein relate to and incorporate laser cleaving and other aspects of the laser cleaving device 100, examples and specific details of laser cleaving systems are known in the art, and are thus omitted here for brevity. Examples of prior teachings about fiber laser cleaving include, for example, U.S. Pat. Publ. 2004/0047587, entitled "Laser Cutting Method and Apparatus for Optical Fibres or Waveguides" and disclosing a cutting method and apparatus "to cut a portion of an optical fibre or waveguide with a laser beam." Abstract. U.S. Pat. No. 6,963,687, entitled "Process for Cutting an Optical Fiber" discloses a process for "cutting or splitting at least one optical fiber at a predetermined angle, wherein the fiber is introduced into a holding and positioning device and is cut by a pulsed laser beam." Abstract. As another example, U.S. Pat. No. 6,774,341 teaches a "method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion." Abstract. The disclosures of the above-mentioned patent publications and patents are incorporated herein by reference. Those skilled in the art will understand how to implement these and/or other known laser cleaving systems that can generate the laser output 120 that is directed at the optical fiber(s) positioned by the fiber holding system 150.

FIG. 1D is an enlarged view of the optical fiber holding system 150 mounted within the laser cleaving device 100. As noted above, the fiber holding system 150 includes support structure 160 that is located within or at least partially within the housing 102 of the laser cleaving device 100. In this implementation the support structure 160 includes a frame portion 162 that fits within the opening 110 in the top portion 104 of the housing. The exterior surface 152 of the support structure 160 shown in FIGS. 1A-1B is formed on the opposite side of the frame portion 162 (not shown in FIG. 1D). The support structure 160 in this example also includes a mounting portion 164 that can be attached or fastened within the cleaving device housing 102 using, for example, bolts (not shown). In this example the mounting portion 164 and the frame portion 162 are provided as integral portions of the support structure 160, though the individual portions can optionally be formed separately and then fastened together.

FIG. 1D partially shows a bottom perspective view of the fiber holding member 170 as it is mounted within part of the support structure 160. Although not shown in FIG. 1D, the fiber holding member 170 is pivotally coupled to the support structure 160 to provide multiple cleaving angles for laser cleaving the mounted optical fiber held by the system. The holding member 170 is pivotable relative to the support structure 160 itself, and is also pivotable relative to the laser cutting plane generated by the laser cutting system of the cleaving device 100. FIG. 1D illustrates the laser output 120 generated by the laser cleaving device 100 in dotted line. The holding member 170 thus positions (e.g., tilts) the mounted optical fiber relative to the support structure 160 and the laser cuts the optical fiber along a laser cutting plane corresponding to the path 120.

FIG. 1D further illustrates an optional stopping feature provided by a stop member 180. The stop member 180 is configured to stop a ferrule or other mounting structure from moving into the laser cutting plane. In this example the stop member 180 is formed separately and fastened to the mounting portion 164 of the support structure 160. As will be explained further herein, the stop member 180 includes at least one stop surface that engages with the end face of the optical fiber's mounting portion (e.g., ferrule) in order to stop the mounting portion from advancing into the damaging laser cutting plane.

Figure 2A:
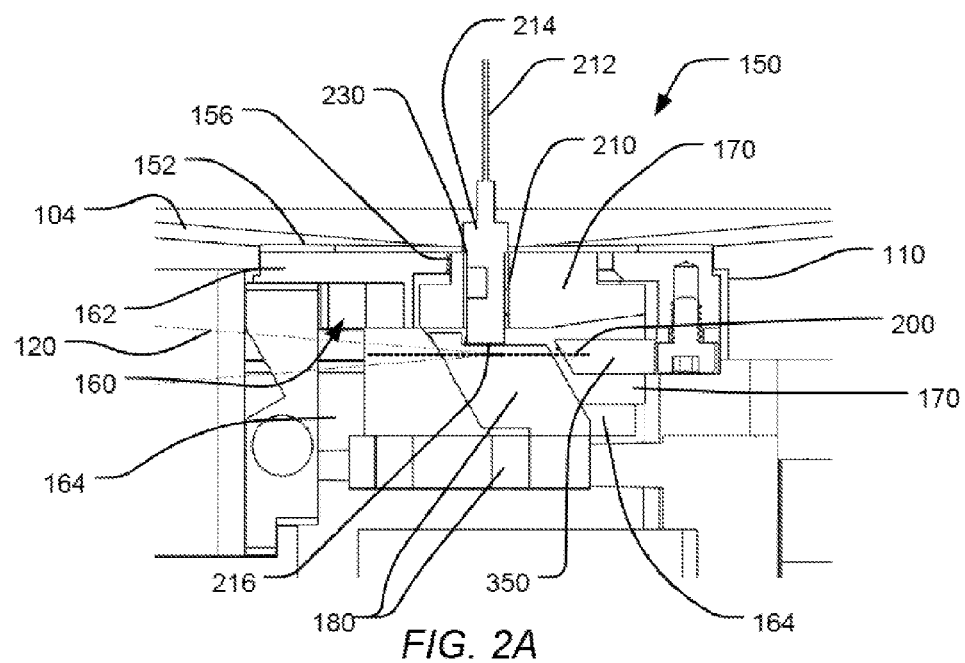
FIG. 2A is a partial cross-sectional view of the laser cleaving device and optical fiber holding system of FIG. 1A providing a zero degree cleaving angle.
Figure 2B:
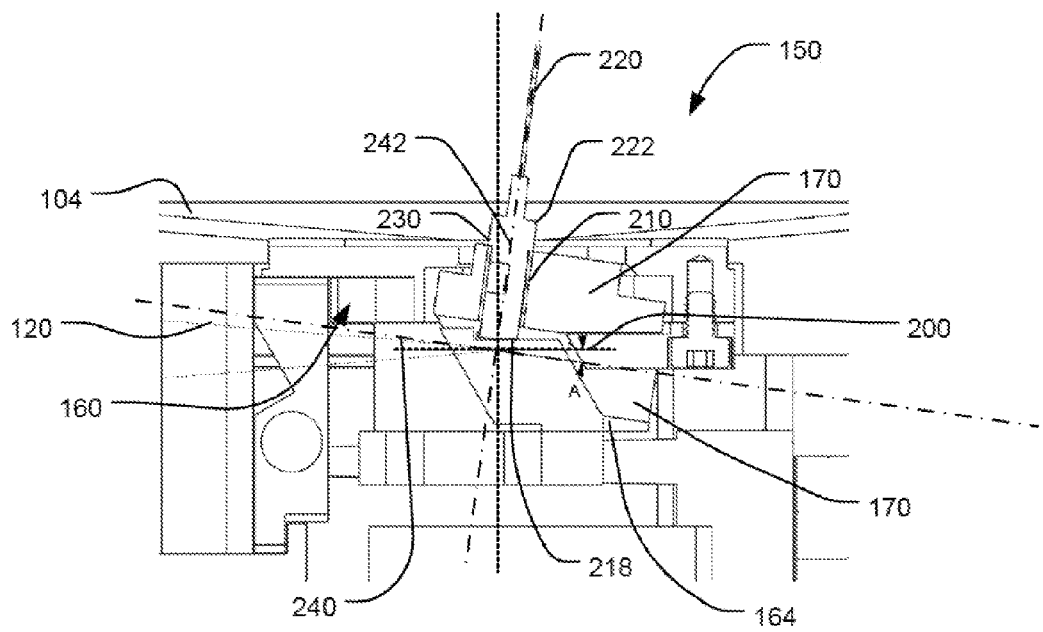
FIG. 2B is a partial cross-sectional view of the laser cleaving device and optical fiber holding system of FIG. 1A providing a non-zero cleaving angle.

FIGS. 2A and 2B are partial cross-sectional views of the optical fiber holding system 150 illustrated in FIGS. 1A-1D, mounted within the assembled laser cleaving device 100 shown in FIG. 1A. As described above with respect to FIG. 1D, an output 120 of the laser cutting system is represented by dashed lines and shown focusing to a point near one or more optical fibers held within the fiber holding member 170. Sweeping of the focused laser output is generally along a laser cutting plane 200. In the illustrated example, the laser output and the holding member 170 are located relative to one another so that the cutting plane 200 is located just below a portion of the holding member 170.

FIG. 2A shows part of the top portion 104 of the laser cleaving device housing 102 in cross-section. The support structure 160 of the fiber holding system 150 includes the frame portion 162 that is positioned within the opening 110, in this case so that the exterior surface 152 of the frame member is adjoining the perimeter of the opening 110. The support structure 160 also includes the mounting portion 164, which extends downward from the frame portion 162 and is fastened to the housing of the laser cleaving device.

Continuing with reference to FIG. 2A, the holding member 170 defines an aperture 210 that is configured to receive the mounted optical fiber and position the mounted fiber proximate the cutting plane 200 of the laser system for cleaving. In this implementation, the aperture 210 is configured with a width, length, and other dimensions that correspond with the size and shape of the mounting structure in which an optical fiber 212 is mounted. In this example, the optical fiber 212 is mounted within a ferrule 214. The ferrule 214 has a length extending through the aperture 210 to an end face 216 of the ferrule 214.

The aperture 210 is configured to receive the ferrule 214 with the ferrule extending through the aperture 210 out from the bottom of the holding member 170. In this implementation the ferrule 214 also includes a shoulder 230 that abuts the rim of the aperture 210 when the ferrule and mounted optical fiber 212 are fully and completely loaded into the aperture 210 for cleaving. According to this example, the abutment of the ferrule shoulder 230 against the edge of the aperture 210 and the configuration of the aperture help ensure that the end face 216 of the ferrule is precisely positioned proximate to the cutting plane 200 in order to achieve the desired cleaving effect on the optical fiber 212.

As noted above, according to one aspect of the invention, the fiber holding member 170 of the fiber holding system 150 is pivotable relative to the support structure 160 and the cutting plane 200 to provide multiple cleaving angles between the cutting plane 200 and the optical fiber 212. As will be discussed further herein, the fiber holding system 150 includes a pivot mechanism to enable relative tilting between the support structure 160 of the holding system and the fiber holding member 170.

FIG. 2A illustrates one possible pivot configuration of the fiber holding system 150. In this implementation, the ferrule 214 holding the optical fiber 212 is configured as a straight ferrule in that the ferrule has an end face that is straight and perpendicular to the axis of the optical fiber 212. The pivot configuration of the fiber holding system 150 in FIG. 2A provides a cleaving angle of zero degrees, as measured between the cutting plane 200 and a plane perpendicular to axis of the optical fiber 212. The zero angle cleaving angle can be used to cleave the optical fiber 212 protruding from the end face 216 of the straight ferrule 214, thus providing the end of the fiber 212 a cleave that is perpendicular to the axis of the fiber.

FIG. 2B illustrates another optional pivot configuration that provides an angle different from the cleaving angle shown in FIG. 2A. In this example, the same fiber holding system 150 as is shown in FIG. 2A is used to provide a non-zero cleaving angle, which in this configuration is greater than zero degrees. In this implementation the fiber holding member 170 is tilted or rotated with respect to the support structure 160 and the laser cutting plane 200, backward and away from the source of the laser output 120. The aperture 210 of the fiber holding member 170 is shown holding an optical fiber 220 mounted within an angled ferrule 222. The rotation of the fiber holding member 170 creates an angular separation A between the laser cutting plane 200 and a plane 240 perpendicular to the axis 242 of the optical fiber 220 and the ferrule 222. The angular separation A corresponds to the non-zero cleaving angle, as well as to the angular end face 218 of the ferrule 222 in this example.

Accordingly, the pivoting of the fiber holding member 170 between the two pivot configurations in FIGS. 2A and 2B creates multiple cleaving angles between the cutting plane 200 of the laser cleaving device and the optical fiber positioned by the holding system. As previously discussed, one practical implementation involves configuring the holding system 150 to work with both a perpendicular end face configuration as shown in FIG. 2A, as well as with an angled end face configuration as shown in FIG. 2B. In some implementations, the angled end face configuration shown in FIG. 2B may have a cleaving angle of substantially eight degrees to correspond to angled physical contact (APC) connectors formed with an angle of eight degrees. The term "substantially" is used herein to refer to nominal magnitudes and amounts that may vary within tolerance ranges acceptable in the industry and known to those skilled in the art.

Of course a wide variety of angles are possible and implementations are not limited to any one cleaving angle or any particular range or group of cleaving angles. The illustrated pivot configurations are described herein in terms of zero degree cleaving angles and cleaving angles that are non-zero and/or greater than zero as the angular separation A increases in the clockwise direction as depicted in FIG. 2B. It should be appreciated, though, that the angular separation A could also be described as a negative angle if positive angles were instead associated with counter-clockwise rotation. Accordingly, those skilled in the art will appreciate that the terminology used herein, including zero degree cleaving angle, non-zero cleaving angle, and greater than zero degrees, are used for convenience with respect the particular illustrations and perspective provided by the figures and not to imply absolute limitations on the scope of possible implementations of the invention.

Also, in some implementations the fiber holding member 170 can be configured to pivot or tilt forward with respect to the holding system 150, toward the source of the laser output 120, which in FIG. 2B would be illustrated as a counter-clockwise rotation. In this case the fiber holding member 170 would tilt toward the laser output 120 to provide a non-zero cleaving angle that could be described as greater than zero degrees or less than zero degrees depending upon the labeling convention being used.

In addition, the fiber holding system 170 may be configured to provide more than two distinct laser cleaving angles in some cases. For example, the holding system 170 could potentially provide a continuous range of cleaving angles as the holding member 170 is pivoted back and forth with respect to the cutting plane 200. In some implementations, two, three, or more discrete cleaving angles may be provided by the fiber holding system 170. Continuous angle ranges and/or discrete cleaving angles can include a zero degree angle, angles less than zero degrees, angles greater than zero degrees, and any combination of these angles depending on the particular implementation and angular measuring convention being used. Referring to the figures, one possible implementation could include discrete angles that include the zero degree configuration shown in FIG. 2A, the greater than zero degree angle shown in FIG. 2B, and an additional cleaving angle (not shown) that is less than zero degrees in the sense that it mirrors the configuration in FIG. 2B with the fiber holding member 170 tilted forward/counter-clockwise. Another possible implementation could include a continuous range of cleaving angles that include the same angles as the discrete range example.

Figure 2C:
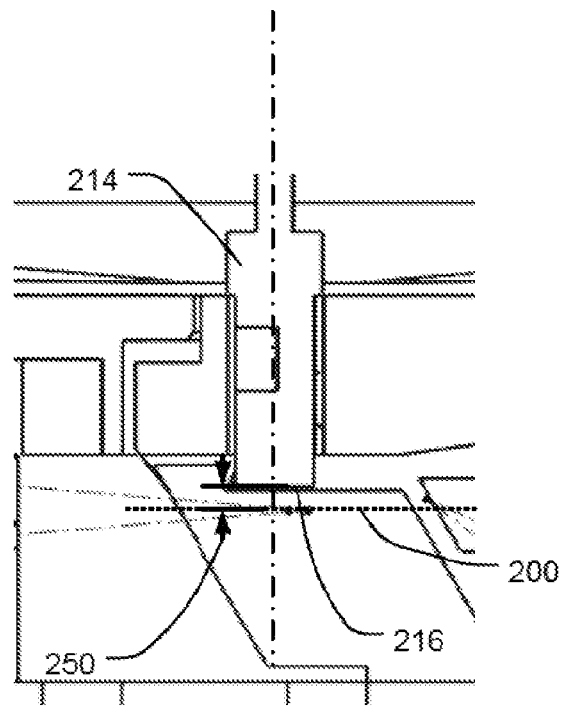
FIG. 2C is an enlarged view of the laser cleaving device and optical fiber holding system of FIG. 2A.
Figure 2D:
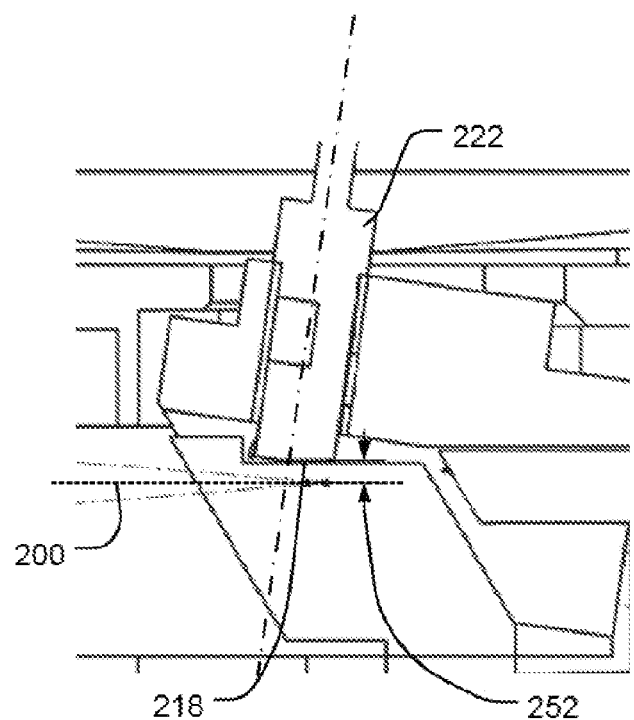
FIG. 2D is an enlarged view of the laser cleaving device and optical fiber holding system of FIG. 2B.

FIGS. 2C and 2D are enlarged views of FIGS. 2A and 2B, respectively, illustrating potential differences in the cut height (e.g., the length of the fiber protruding from the end face of the ferrule after cleaving) for different cleaving angles. As shown in both FIGS. 2C and 2D, the cut height (i.e., length) of the laser cleaving device can be determined as a distance along the axis of the ferrule, extending between the cutting plane 200 and the end face of the ferrule. Based on this characterization, a cut height or length 250 is illustrated in FIG. 2C as the distance or length between the laser cutting plane 200 and the end face 216 of the ferrule 214. Similarly, a cut height or length 252 is illustrated in FIG. 2D as the distance between the laser cutting plane 200 and the end face 218 of the ferrule 222. In FIG. 2D, the cut height 252 is depicted as the distance between the laser cutting plane 200 and the angled portion of the end face 218, which in this implementation becomes parallel to the cutting plane 200 when the ferrule 222 is tilted as shown in FIG. 2D.

Another optional feature that is included in some implementations provides substantially the same cutting length for both straight and angled fibers. For example, in some cases the cut length 250 provided by the fiber holding system for the zero degrees cleaving angle shown in FIG. 2C is substantially the same as the cut length 252 provided by the fiber holding system for the non-zero cleaving angle shown in FIG. 2D. Accordingly, a single fiber holding system may optionally define the cut length 250 corresponding to one cleaving angle as being substantially the same as the cut length(s) defined by one or more additional cleaving angle(s). Some implementations thus provide a fiber holding system that enables highly consistent cutting lengths across multiple cleaving angles.

When considering the example and features described above with respect to FIGS. 1A-1D and 2A-2B, it should be appreciated that the depicted implementation of the fiber holding system 150 is formed as a separate fixture body that can be removably fastened within the laser cleaving device housing 102, and also unfastened to remove the holding system 150 from the laser cleaving device 100. This particular implementation of the fiber holding system 150 thus optionally provides a removable adapter that can be configured for loading a particular type of ferrule or other fiber mounting portions. Additional adapters can be further configured for other types of ferrules and/or fiber mounting portions. Thus, one aspect that can optionally be provided is a set of removable fiber/connector adapters that can be swapped in and out of the laser cleaving device 100. As noted above and will be explained in further detail below, configuring the adapters to include tilt-adjustable holding members provides another feature that also increases the versatility of each individual adapter.

FIGS. 3A-11 and the accompanying description provide additional details about the removable adapter implementation for the fiber holding system 150 discussed above with respect to FIGS. 1A-1D. It should be appreciated that the depicted and described fiber holding system 150 is just one possible implementation of the features and other aspects disclosed herein. Optional modifications are contemplated and can be made to vary aspects and features of the fiber holding system depending, for example, on the particular design requirements for a particular implementation. As just one possible, optional variation, in some implementations the support structure 160 of the fiber holding system 150 can be considered as including one or more parts of the laser cleaving device housing 102, and may optionally be part of or integral with the housing 102. For example, in some implementations, the mounting portion 164 of the support structure 160 may be integral with the top portion 104 of the housing. In addition, it is contemplated that in some cases the exterior surface 152 of the support structure may be integral to the top housing portion 104 rather than a separate component that fits within the opening 110.

Turning now to FIGS. 3A-11, views and features of a removable optical fiber fixture or adapter 300 will be described. The fixture 300 is generally configured to be removably fastened within the laser cleaving device 100 shown in FIGS. 1A-2D, and also unfastened to remove the fixture from the laser cleaving device. Accordingly, the fixture 300 provides an example of one possible implementation of a fiber holding system for a laser cleaving device.

Figure 3A:
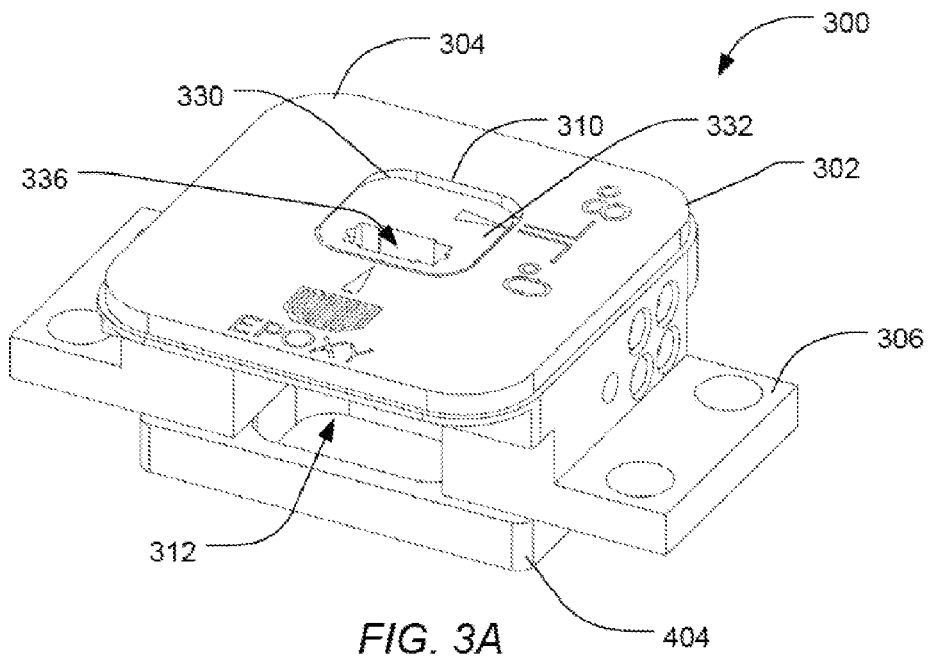
FIG. 3A is a top perspective view of an optical fiber fixture for use with a laser cleaving device.
Figure 3B:
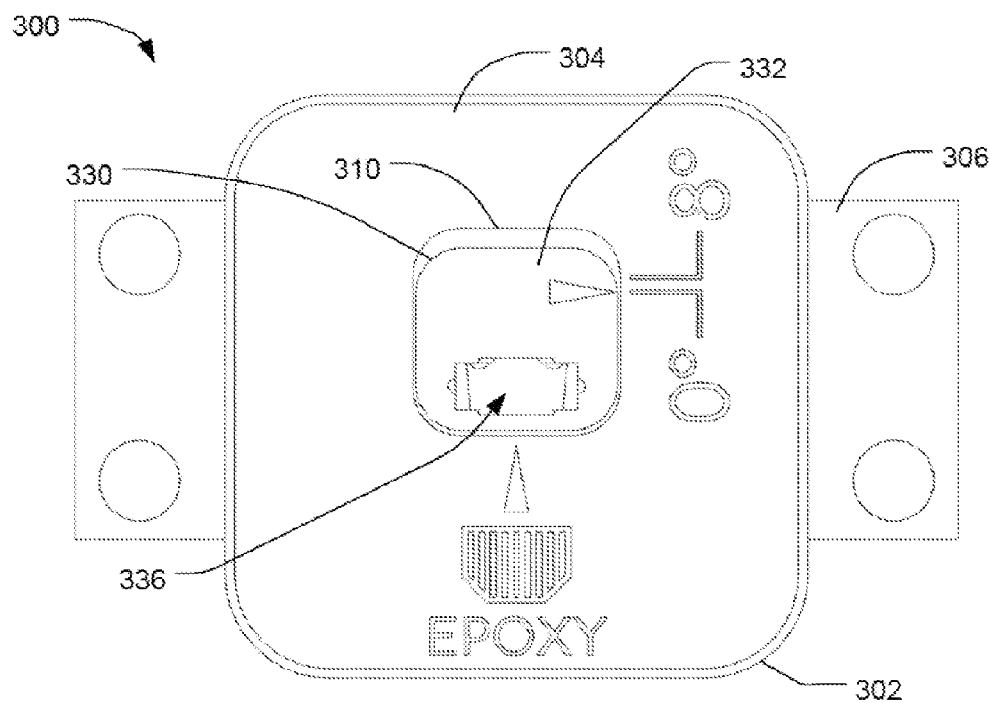
FIG. 3B is a top view of the optical fiber fixture of FIG. 3A.
Figure 3C:
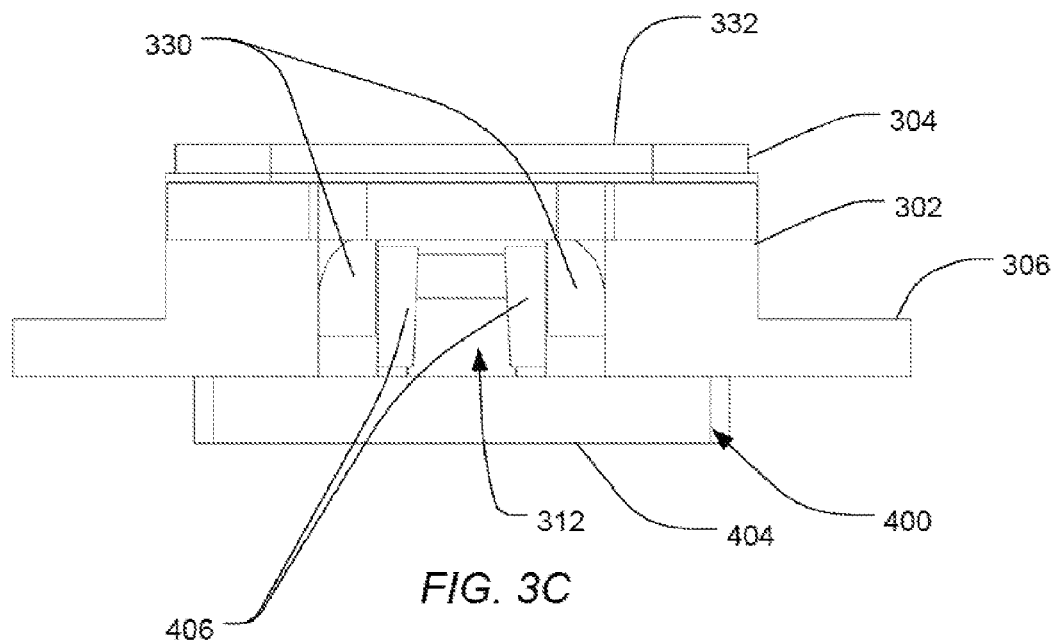
FIG. 3C is a side elevation view of the optical fiber fixture of FIG. 3A.
Figure 3D:
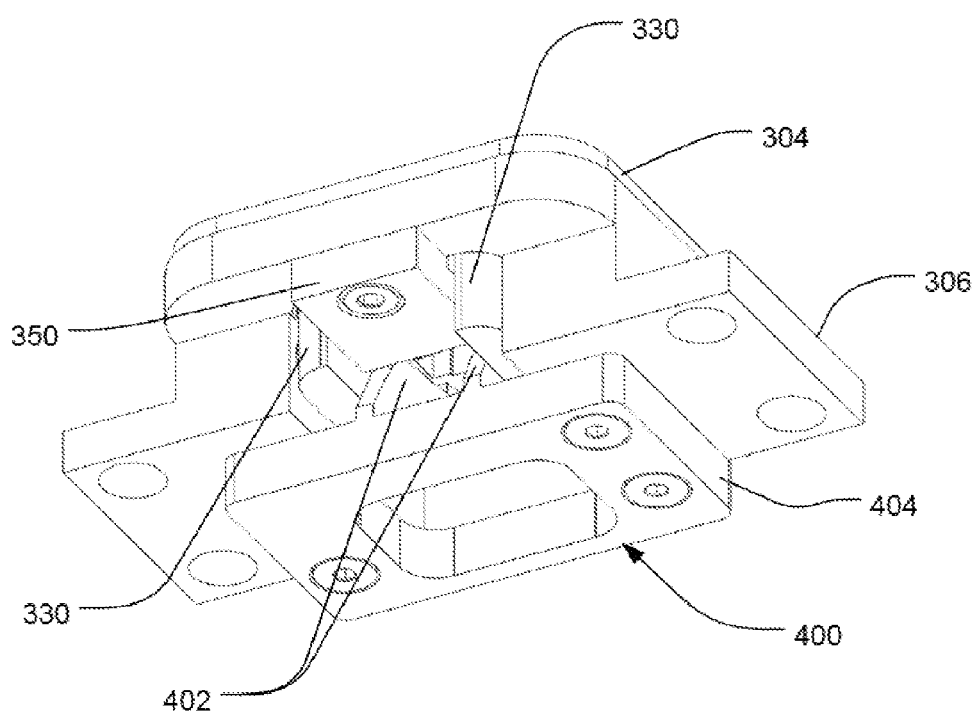
FIG. 3D is a bottom perspective view of the optical fiber fixture of FIG. 3A.

FIG. 3A is a top perspective view of the optical fiber fixture 300 for use with a laser cleaving device such as the laser cleaving device 100 discussed above. The fixture 300 includes a fixture body 302 that has a frame portion 304 and a mounting portion 306 for mounting the fixture body 302 within a laser cleaving device that has a housing and defines a laser cutting plane such as the cutting plane 200 illustrated in other figures herein.

Figure 3E:
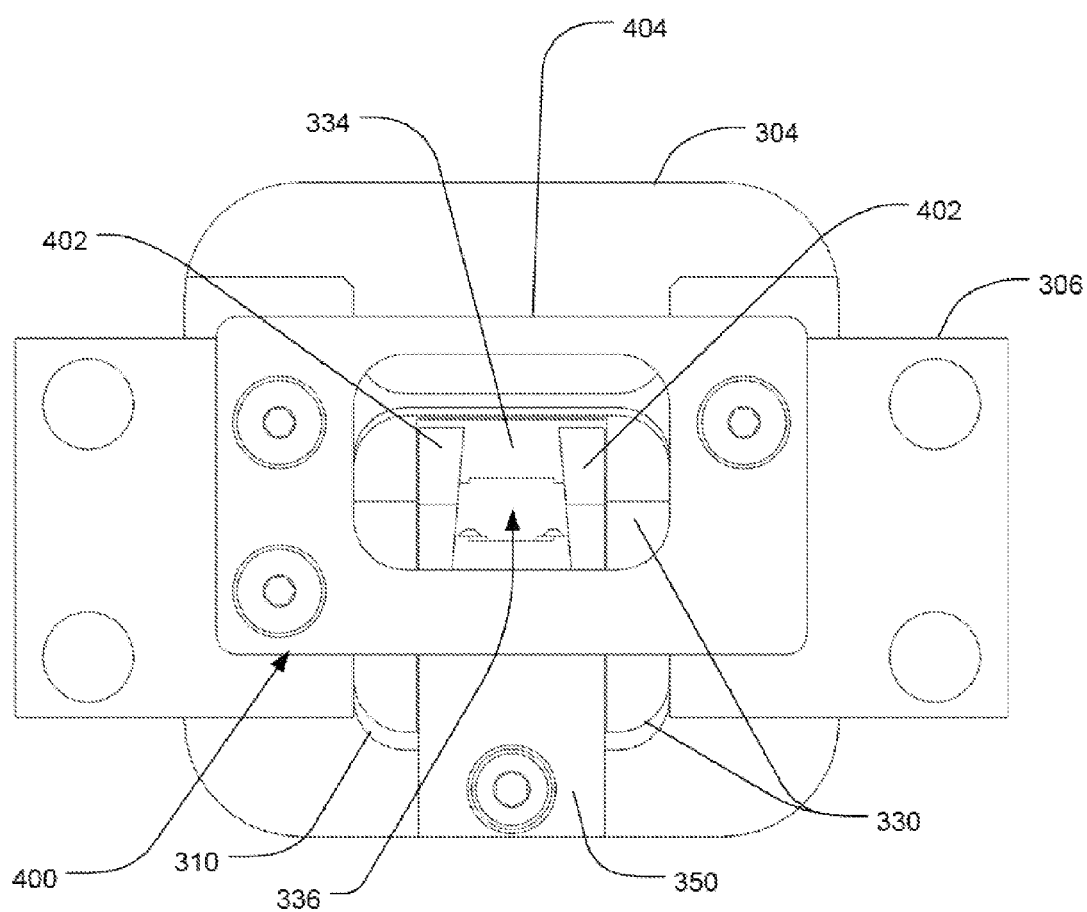
FIG. 3E is a bottom view of the optical fiber fixture of FIG. 3A.
Figure 4:
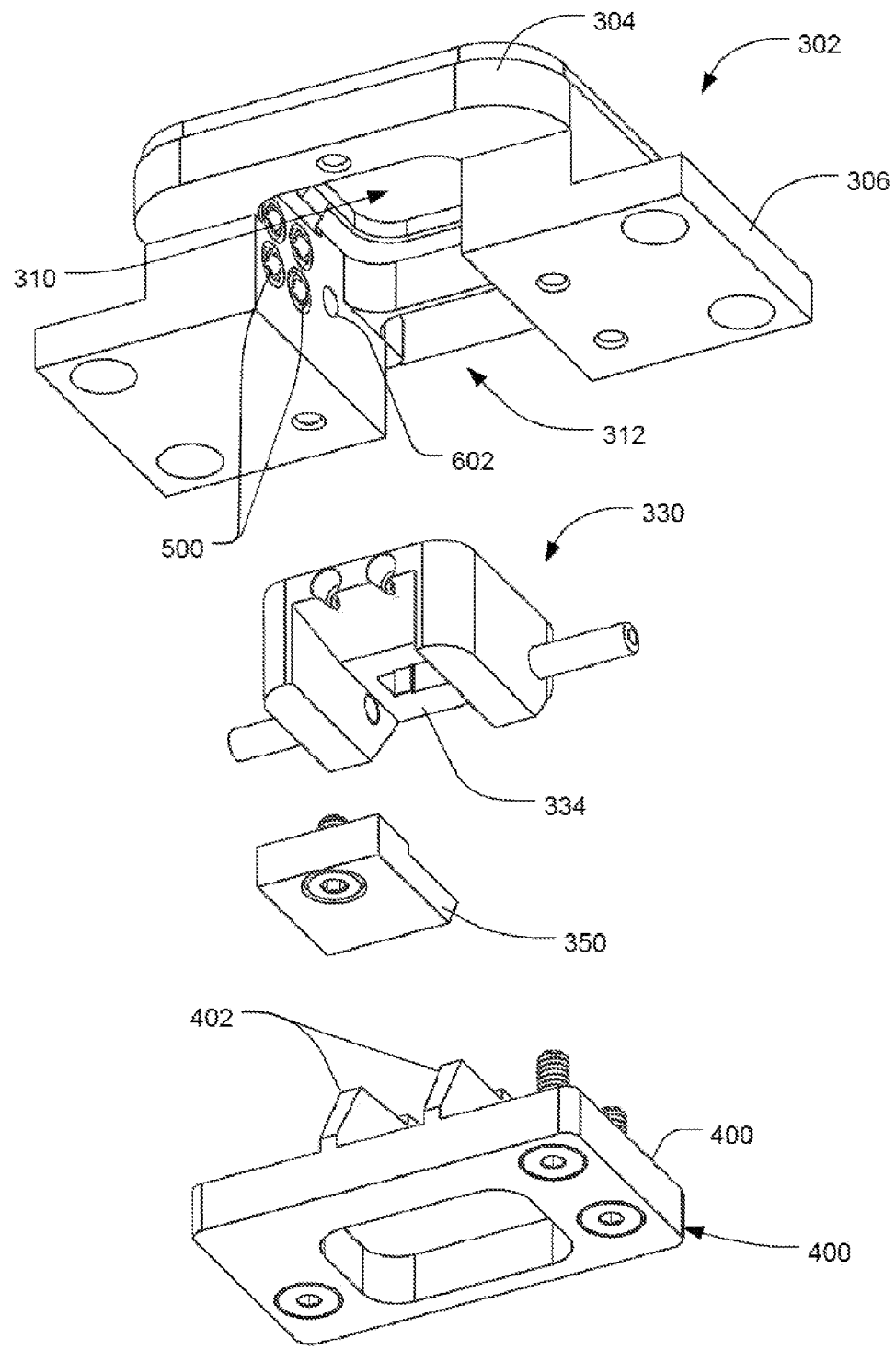
FIG. 4 is an exploded view of the optical fiber fixture of FIG. 3A.

FIG. 3B-3E provide additional views of the fixture 300, while FIG. 4 provides an exploded view of the optical fiber fixture 300 of FIG. 3A. The frame portion 304 of the fixture body defines a first aperture 310, while the mounting portion 306 defines a void 312 that is adjacent to the first aperture 310. The mounting portion 306 is removably mountable within a housing of a laser cleaving device to make the frame portion 304 accessible through an opening in the housing, and to locate the cutting plane within the void 312.

The optical fiber fixture 300 also includes a holding member 330 that is pivotally coupled to the fixture body 302 within the void 312. The holding member 330 has a first surface 332 that is accessible through the first aperture 310. The holding member 330 also has a second surface 334 opposite the first surface 332. A second aperture 336 extends through the holding member 330 from the first surface 332 to the second surface 334 and is configured to receive and position a corresponding mounted optical fiber relative to the cutting plane in a laser cleaving device.

As discussed above, according to one aspect, the holding member 330 is pivotable relative to the fixture body 302 and an associated cutting plane to provide a plurality of cleaving angles between the cutting plane and the mounted optical fiber. As shown above with respect to FIGS. 2A and 2B, the plurality of cleaving angles can in some cases include a first cleaving angle that is zero degrees and a second cleaving angle that is greater than zero degrees. For example, in some cases the non-zero cleaving angle may be eight degrees. Further, in some cases a non-zero cleaving angle may be considered to be an angle that is less than zero degrees depending on the particular angular measurement system being used. In some cases the plurality of cleaving angles may optionally include a zero degree cleaving angle, and at least one cleaving angle that is greater than zero degrees and at least one cleaving angle that is less than zero degrees.

According to some implementations, the fiber fixture 300 includes a laser deflector 350, which is mounted to the frame portion 304 of the fixture body 302. The laser deflector 350 includes an angled face that directs the laser output down away from the fiber holding system and optical fiber/ferrule after it has accomplished the desired cleaving. Referring to FIGS. 3A-4 and 7A-7B, in some cases the fiber fixture 300 includes a stop member 400, that is configured to stop an optical fiber ferrule or other mounting structure from advancing into the laser cutting plane. The stop member 400 in this example includes two extension members 402 that extend up from a base 404 of the stop member toward the holding member 330. Each of the extension members 402 includes an angled face 406 that directs stray laser output downward in a manner similar to that of the laser deflector 350.

Figure 7A:
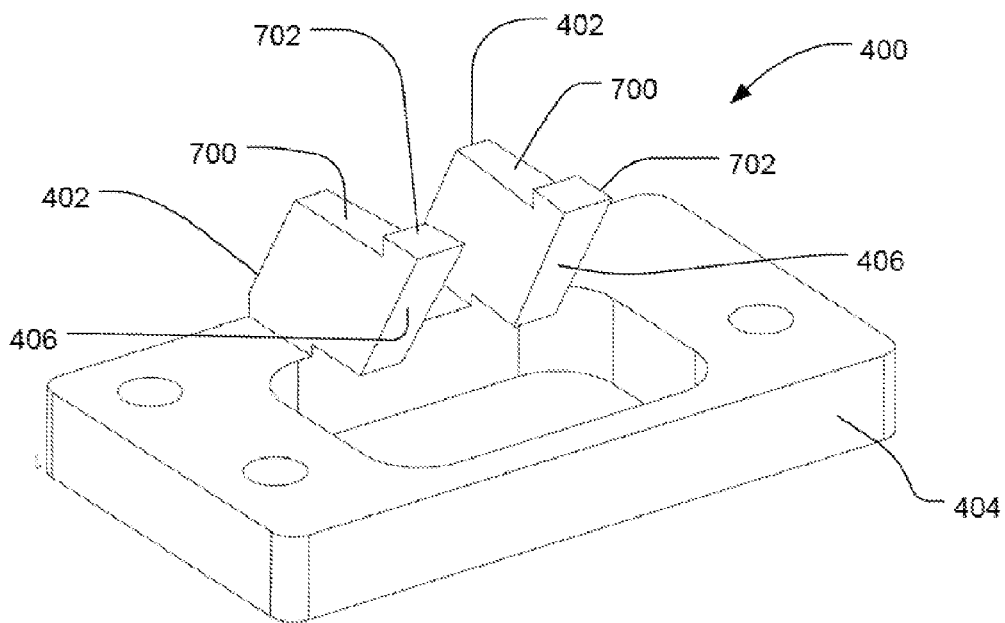
FIGS. 7A-7B are perspective views of a stop member of the optical fiber fixture of FIG. 4.
Figure 7B:
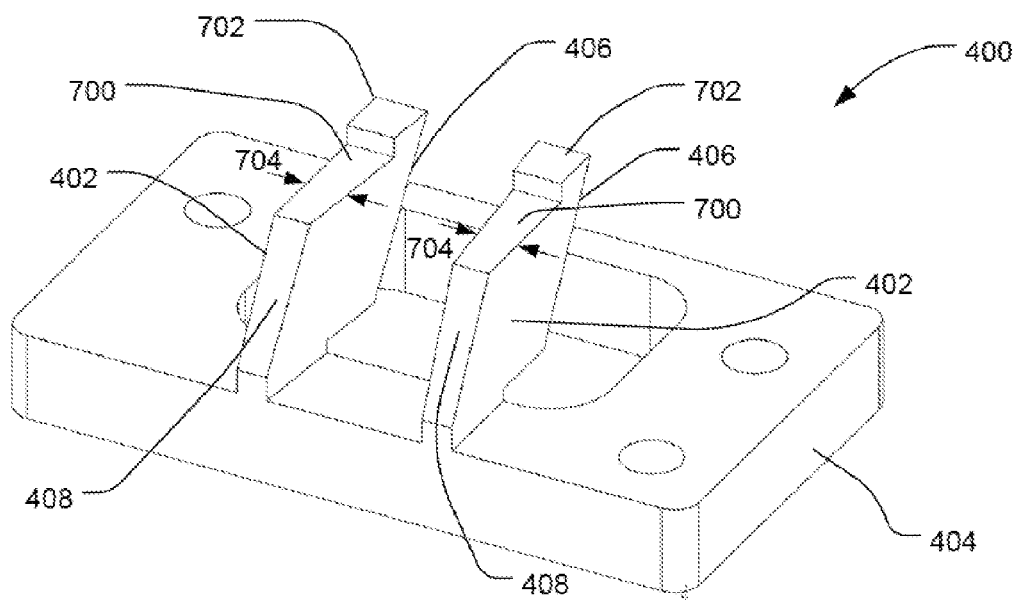

FIG. 3E illustrates another aspect of the disclosure that can optionally be implemented in some cases. As shown in this view, the extension members 402 of the stop member 400 angle away from a ferrule that would be held in the aperture 336 of the holding member 330. In some cases the angling of the extension member 402 can facilitate a sharper laser output and cutting plane. FIG. 7B illustrates how the width of each extension member 402 in this example decreases from the angled face 406 toward a narrower rear face 408 as the extension member angles away from the aperture 336.

Figure 5A:
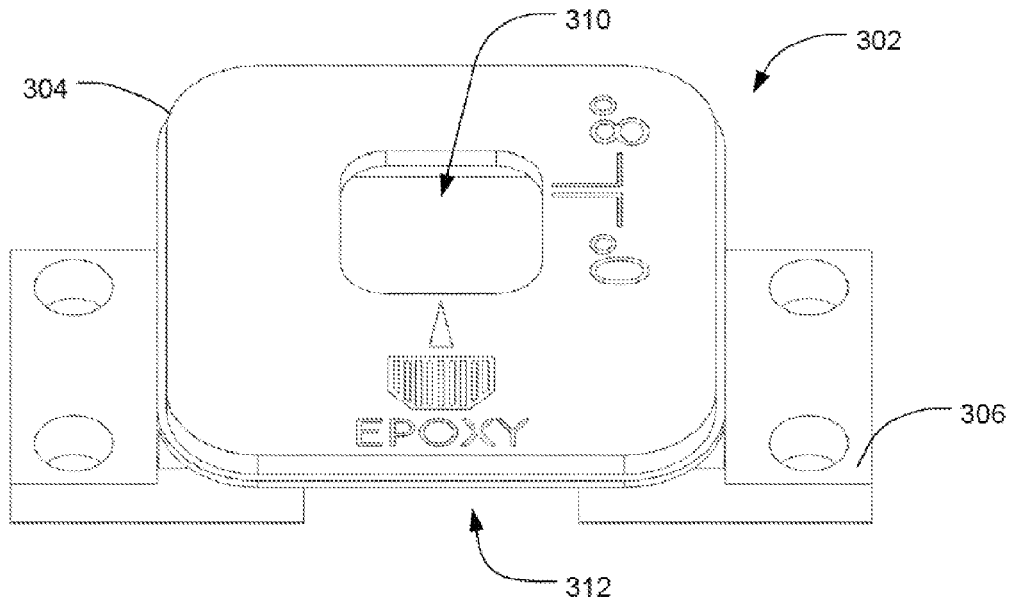
FIGS. 5A-5B are top and bottom perspective views of a fixture body of the optical fiber fixture of FIG. 4.
Figure 5B:
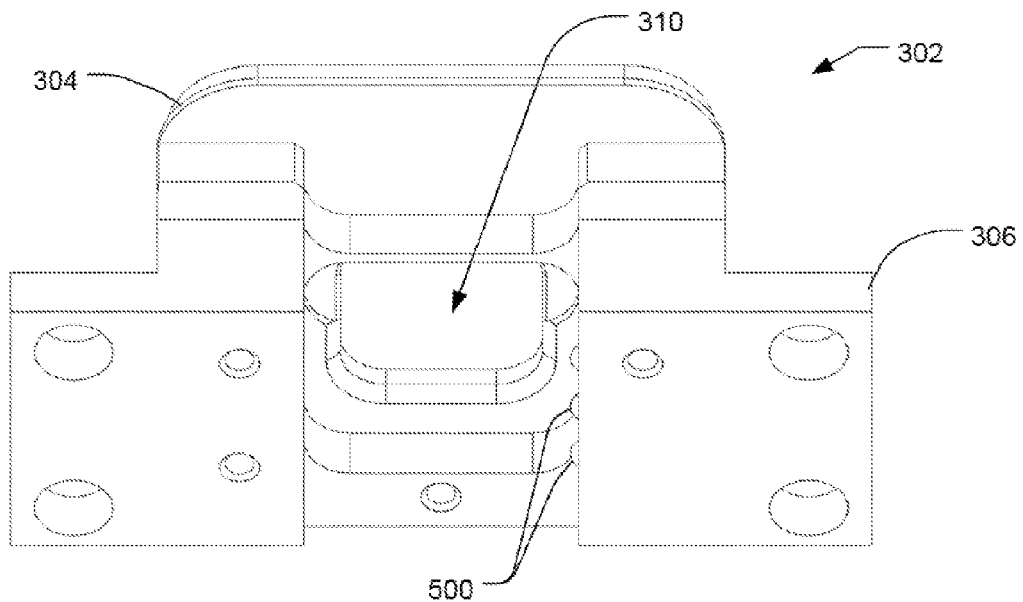
Figure 5C:
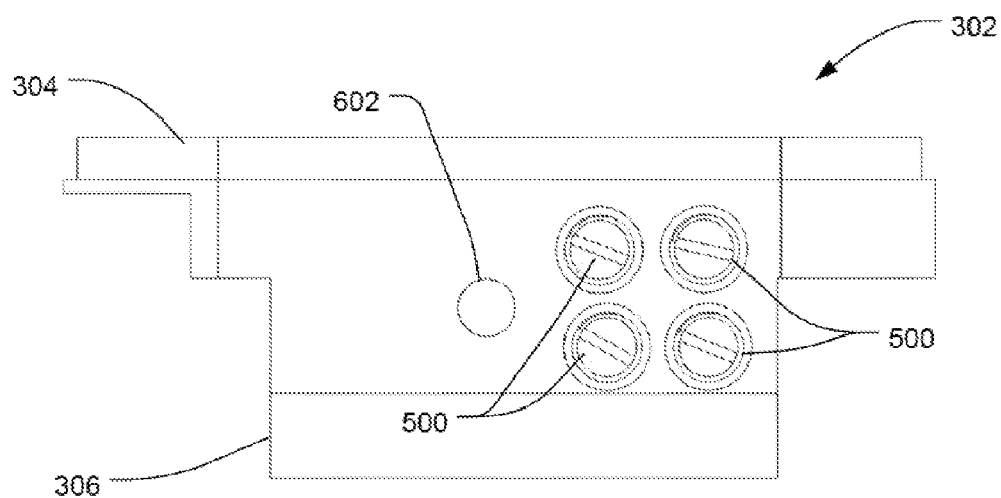
FIG. 5C is a side elevation view of the fixture body of FIGS. 5A-5B.

FIGS. 5A-5B are top and bottom perspective views of the fixture body 302 of the optical fiber fixture 300 of FIG. 4. FIG. 5C is a side elevation view of the fixture body 302 of FIGS. 5A-5B. FIGS. 5C and 4 illustrate an optional pivot catch assembly that includes a first part provided spring-loaded elements 500 that may in some cases be spring-loaded ball plungers. The pivot catch assembly also includes a second part that in this case is provided by recesses or detents 510. The spring-loaded elements engage with the recesses 510 on the fiber holding member 330 in order to provide multiple discrete cleaving angles. For example, in the depicted implementation, the optical fiber fixture 300 includes four spring-loaded elements 500 with a set of two elements above another set of two elements. FIG. 6C illustrates four corresponding recesses or detents 510 formed in the side of the fiber holding member 330 so as to engage with the spring-loaded elements 500 mounted within the fixture body 302.

The recesses 510 have a spacing and angled layout so that the two bottom recesses 510 engage with the two bottom spring-loaded elements 500 to provide a zero degrees cleaving angle such as is shown in FIGS. 2A and 2C. As the fiber holding member 330 pivots about the axis of the pivot pins 600, the top two recesses 510 engage the top two spring-loaded elements 500 mounted in the fixture body 302. This kind of positive engagement between the spring-loaded elements and the recesses advantageously provides the fiber holding fixture and corresponding laser cleaving devices with a highly repeatable and accurate mounting configuration for multiple cleaving angles. Of course other arrangements and/or types of temporary engaging members may be used to provide positive engagement between the holding member 330 and the fixture body 302. As just one example, in some cases a holding member may include spring-loaded elements that engage with corresponding detents provided in a fixture body.

Figure 6A:
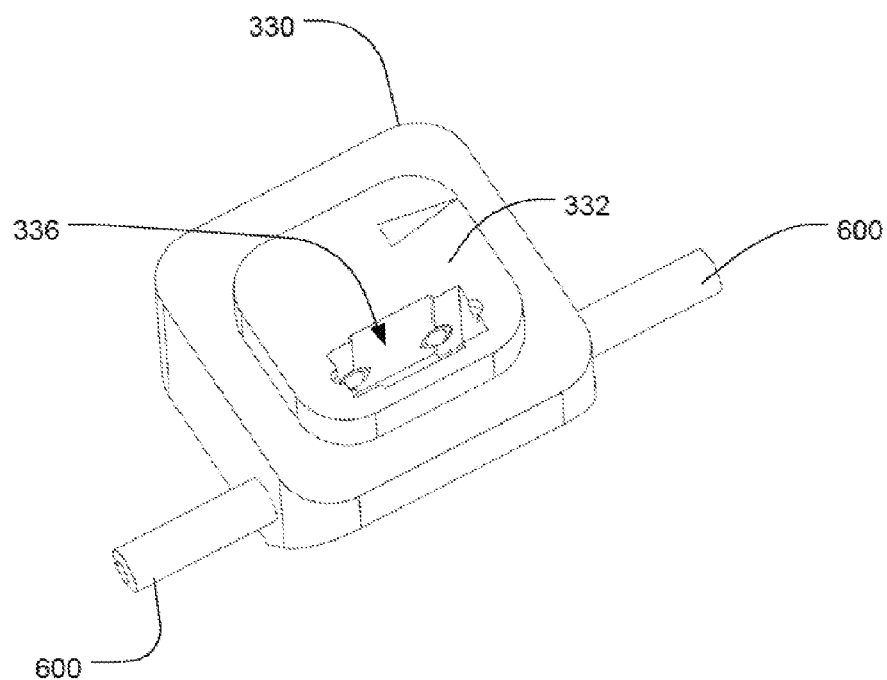
FIG. 6A is a top perspective view of a holding member and pivot pins of the optical fiber fixture of FIG. 4.
Figure 6B:
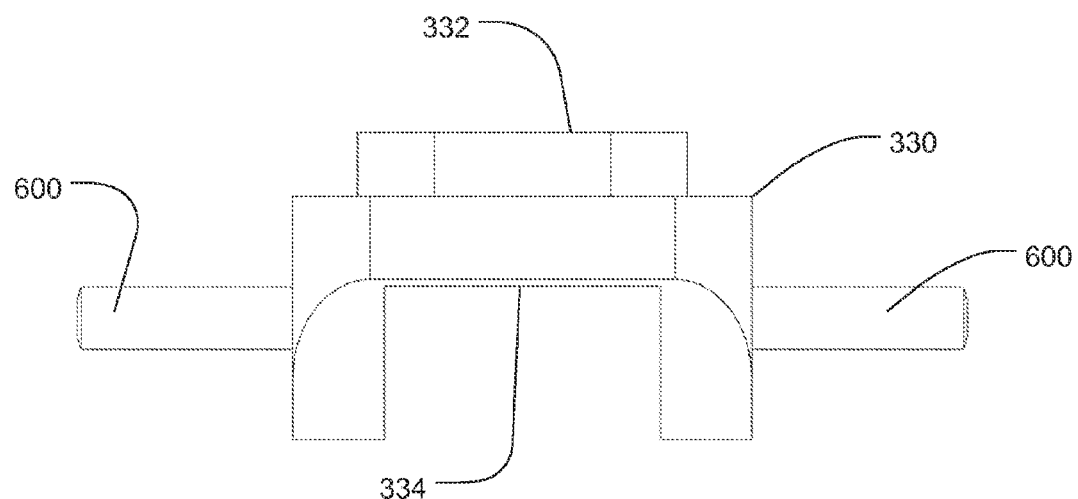
FIG. 6B is a front elevation view of the holding member and pivot pins of FIG. 6A.
Figure 6C:
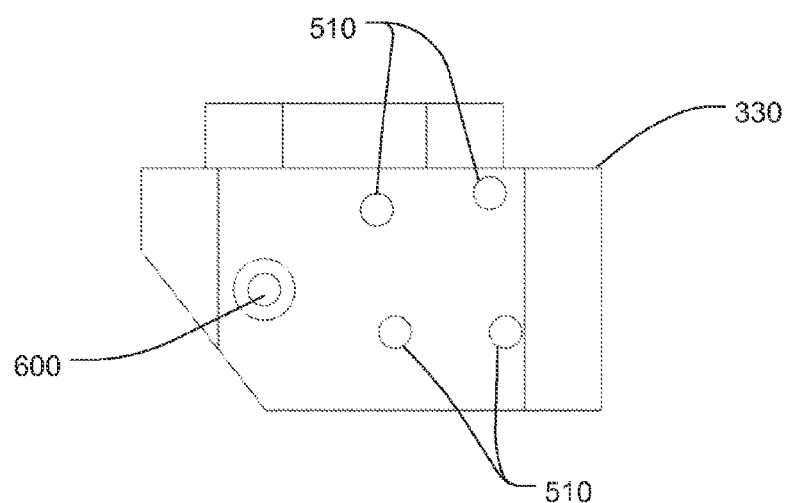
FIG. 6C is a side elevation view of the holding member and pivot pins of FIG. 6A.

FIG. 6A is a top perspective view of the holding member 330 and pivot pins 600 of the optical fiber fixture 300 of FIG. 4. The pivot pins 600 operate as a pivot mechanism that pivotally couples the holding member 330 to the support structure/fixture body 302. In this example, the fixture body 302 includes pivot pin holes 602 (seen in FIGS. 4, 5C) that receive the pivot pins 600 and together provide a pivot mechanism for pivotally coupling the holding member 330 to the support structure provided by the fixture body 302. FIG. 6B is a front elevation view of the holding member 330 and pivot pins 600 of FIG. 6A. FIG. 6C is a side elevation view of the holding member 330 and pivot pins 600 of FIG. 6A. FIG. 6C also illustrates the placement of the optional recesses 510 that engage with the spring-loaded elements FIGS. 7A-7B are perspective views of a stop member 400 of the optical fiber fixture 300 of FIG. 4. The stop member 400 is configured to stop movement of an optical fiber ferrule or other mounting structure so that it does not inadvertently enter the laser cutting plane of a laser cleaving device. This optional feature advantageously addresses situations in which a technician may incorrectly load a mounted optical fiber (e.g., a fiber mounted within a ferrule or other mounting structure) into the slot 336 of the holding member 330. For example, in some cases it might be possible for a technician to incorrectly load a ferrule with a straight end face or an angled end face in such a way that increases the risk that a portion of the ferrule or other mounting structure will cross into the cutting plane and become burned or otherwise damaged by the laser output during the cleaving process.

As shown in FIGS. 7A-7B, the stop member 400 in this example includes two extension members 402 that extend up from a base 404 of the stop member. Each extension member 402 includes a stop surface 700. The base 404 and extension members 402 are configured to position the stop surface 700 of each extension member 402 just above the laser cutting plane within a laser cleaving device. The extension members 402 are spaced apart so that the stop surfaces 700 engage outer portions of the end face of a fiber mounting structure (e.g., ferrule end face), thus allowing the optical fiber(s) exiting the end face to extend into the laser cutting plane between and just below the stop surfaces 700 for cleaving.

As noted above, each of the extension members 402 in the depicted implementation includes an angled face 406 that directs stray laser output downward in a manner similar to that of the laser deflector 350. Directing the laser output in this way can be useful for reducing and/or preventing reflections back to the laser output and/or in other undesired directions. One optional feature incorporated into the embodiment as shown in FIGS. 7A and 7B includes a blocking portion 702 of each extension member 402 that extends upward from the stop surface 700. During cleaving, a ferrule or other fiber mounting structure is positioned upon or above the stop surfaces 700, with the blocking portions 700 of the extension members 402 located between the ferrule and the laser output. The extra height of each blocking portion 702 above the stop surface 700 allows the extension member to stop the laser output from entering into any gap existing between the end face of the ferrule and the stop surface 700 of the extension member.

FIG. 7B also illustrates how the extension members 402 are designed with a decreasing width 704 that results in a narrower gap between the front angled faces 406, and a wider gap between the end faces 408 of the extension members. The angled sides of the extension members 402 created by the narrowing width can in some cases facilitate a sharper laser output and cutting plane for cleaving optical fibers.

Figure 8:
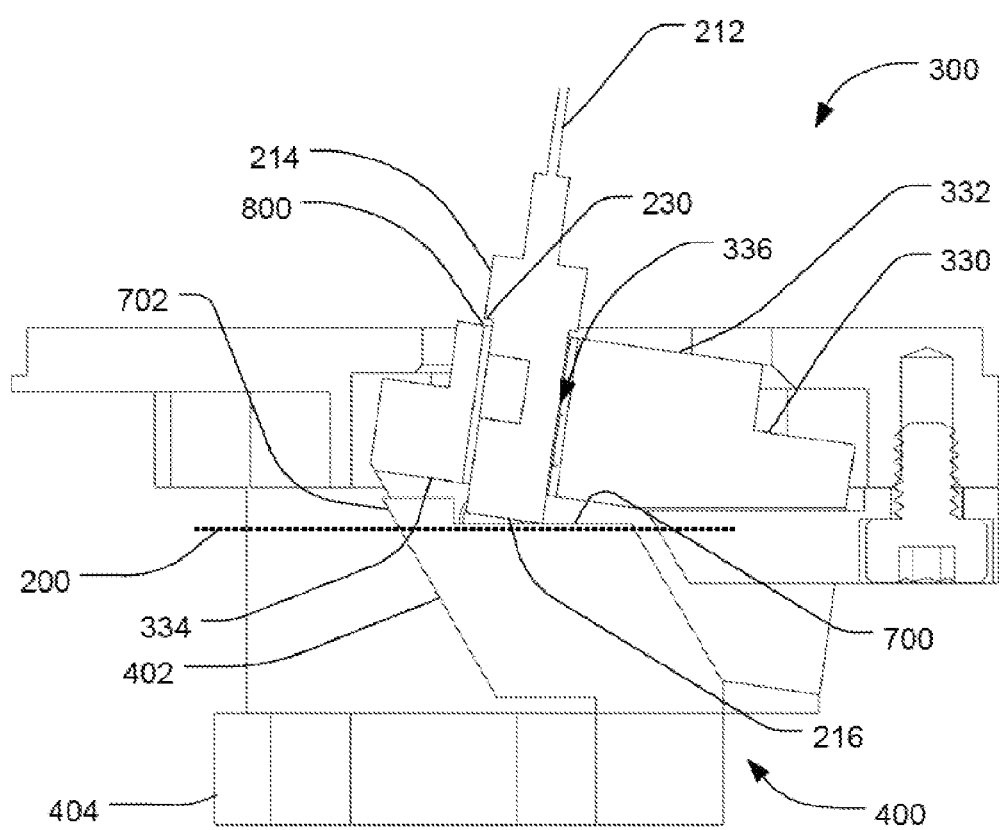
FIG. 8 is a partial cross-sectional view of a fiber holding system holding an optical fiber and ferrule.
Figure 9:
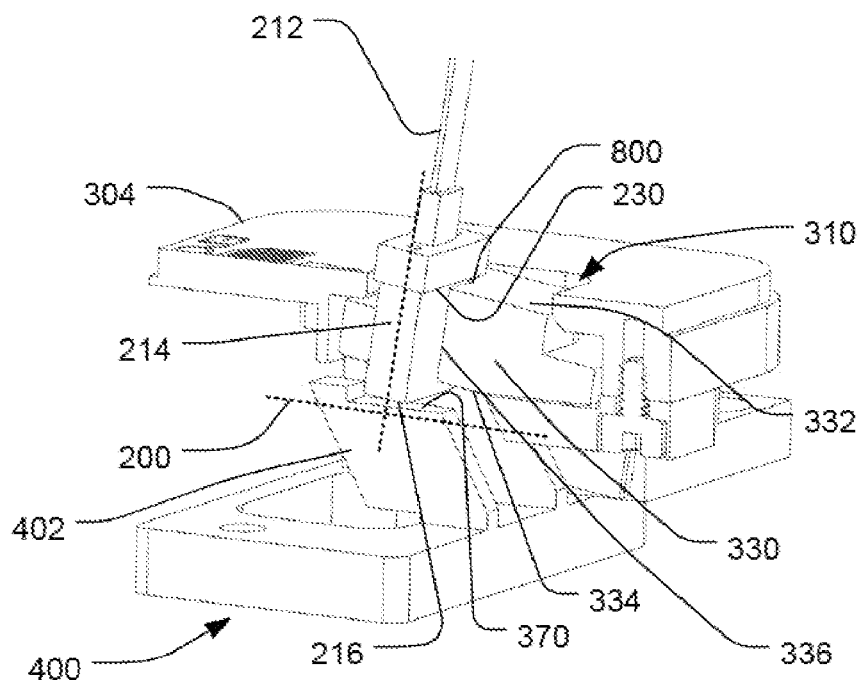
FIGS. 9-10 are partial perspective and cross-sectional views of the fiber holding system and optical fiber and ferrule of FIG. 8.
Figure 10:
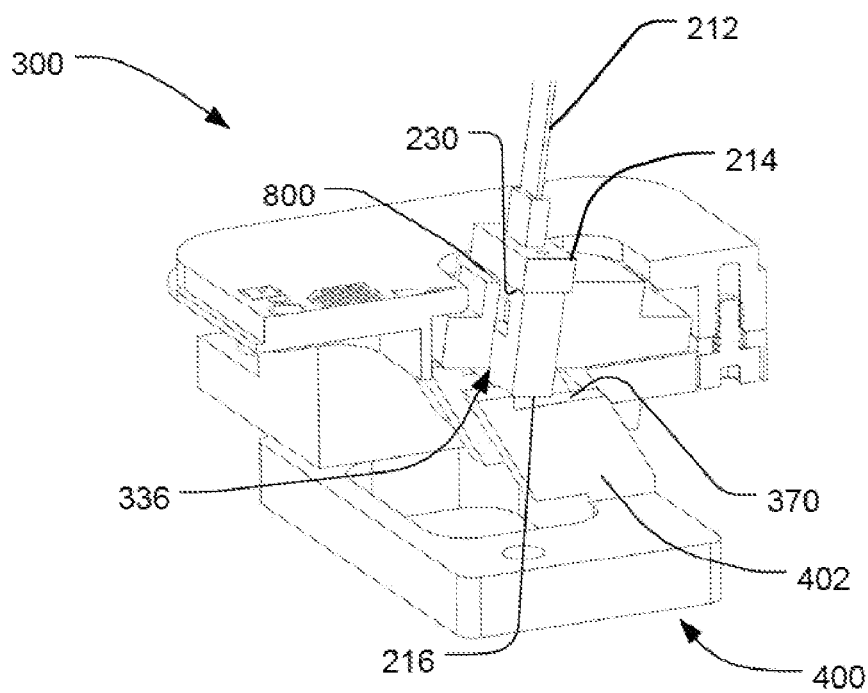

FIGS. 8-10 will now be discussed to illustrate the stop member 400 engaging a fiber ferrule that is incorrectly loaded within a fiber holding system for optical fiber laser cleaving. FIG. 8 is a partial cross-sectional view of a fiber holding system for an optical fiber laser cleaving device. As can be seen, in this example, the fiber holding system is depicted as the removable optical fiber adapter 300 shown in FIGS. 3A-3E. An MT-type fiber ferrule 214 connected to a multi-fiber ribbon cable 212 is loaded within the second aperture 336 of the fixture's holding member 330. FIGS. 9-10 are partial perspective and cross-sectional views of the same fiber holding system and optical fibers 212 mounted within the MT ferrule 214.

The optical fiber adapter 300 includes the stop member 400 and corresponding stop surfaces 700 that are configured to stop an incorrectly loaded ferrule from extending into the laser cutting plane 200. FIGS. 8-10 shows that the MT ferrule 214 has a straight or perpendicular end face 216, but that the ferrule 214 is incorrectly loaded into the fiber holding member 330 when it is tilted to a non-zero cleaving angle.

As with the ferrule 214 discussed above with respect to FIG. 2A, the MT ferrule 214 includes a shoulder 230 that abuts a rim 800 of the aperture 336 if and when the ferrule and optical fiber 212 are completely loaded into the aperture 336 for cleaving. As seen in FIGS. 8-10, the rim 800 is also part of the first surface 332 of the holding member 330 in this example. As previously noted, the abutment of the ferrule shoulder 230 against the rim or edge 800 of the aperture 336 ordinarily helps ensure that the ferrule is precisely positioned next to the cutting plane 200 for cleaving when the holding member 330 is in the zero cleaving angle pivot configuration shown in FIG. 2A. As can be seen in FIGS. 8-10, however, when the holding member 330 is in the depicted non-zero cleaving angle configuration, the end face 216 of the ferrule contacts the stop surfaces 700 before the shoulder 230 of the ferrule 214 reaches the rim 800 of the aperture 336. The stop member 400 thus stops the straight ferrule 214 from being completely loaded within the holding member aperture 336 in this non-zero cleaving angle pivot configuration. Stopping the complete loading of the straight ferrule in this way advantageously prevents the end face 216 of the ferrule from crossing into the cutting plane 200, avoiding damage to the ferrule 214.

Figure 11:
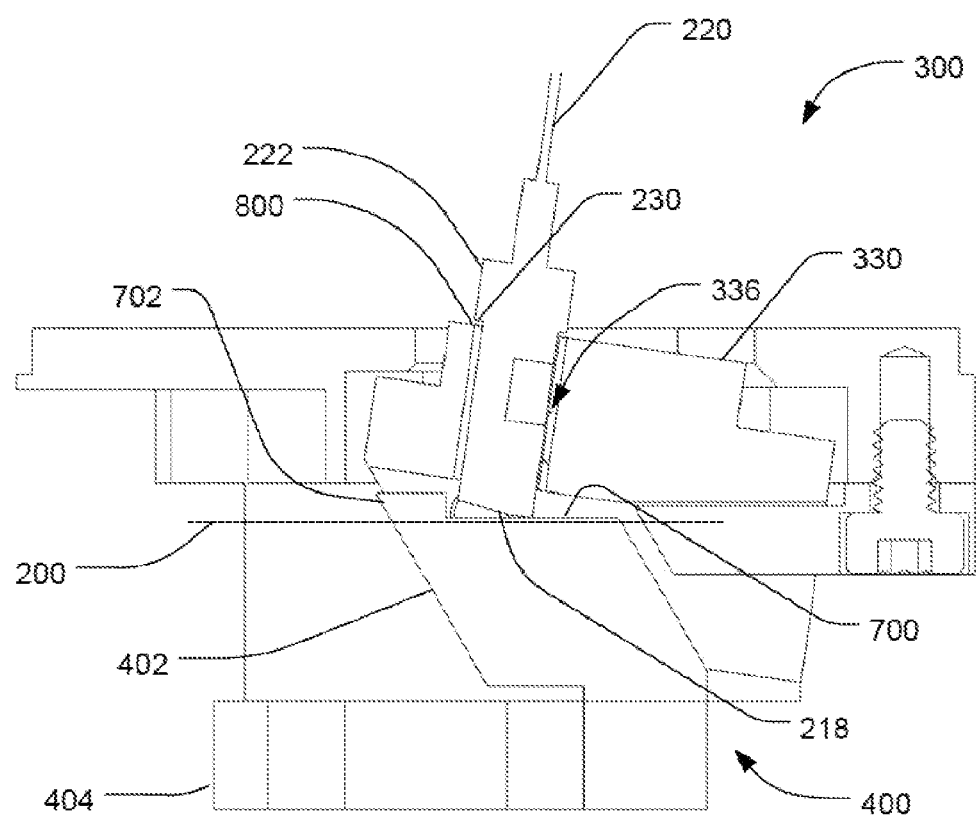
FIG. 11 is a partial cross-sectional view of a fiber holding system holding an optical fiber and ferrule.

FIG. 11 is also a partial cross-sectional view of the optical fiber holding system 300. In this example, the holding member 330 is tilted backward into a nonzero cleaving angle pivot configuration. Another MT ferrule 222, in this case with an angled end face 218, is incorrectly loaded in the holding member 330 in a backward orientation. As will be appreciated, in the absence of the stop member 400, the tip of the ferrule 222 could potentially cross into the cutting plane 200 if it were completely loaded into the aperture 336 of the holding member 330. Instead, the stop surfaces 700 of the stop member 400 are located between the cutting plane 200 and the second surface 334 of the holding member 330. In this position, the stop surfaces 700 engage the end face 218 and stop movement of the ferrule 222 into the cutting plane 200. Further, in this implementation the incomplete loading of the ferrule 222 (e.g., FIG. 11 shows that the shoulder 230 of the ferrule is not abutting the rim 800 of the loading slot or aperture 336) is an indication to a technician that the ferrule is incorrectly loaded and must be removed.

Figure 12:
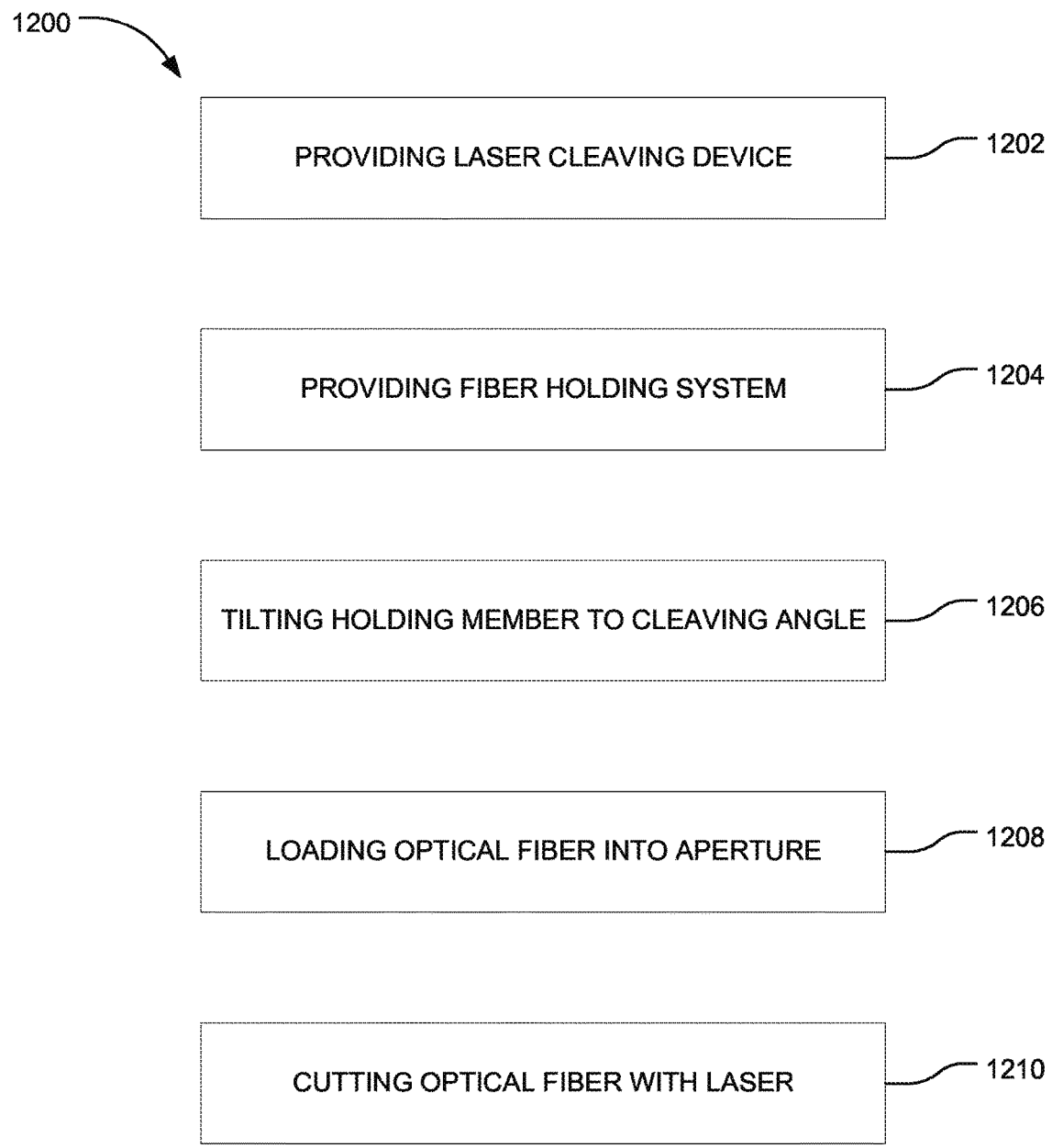
FIG. 12 is a flow diagram illustrating a method for cleaving an optical fiber.
Figure 13:
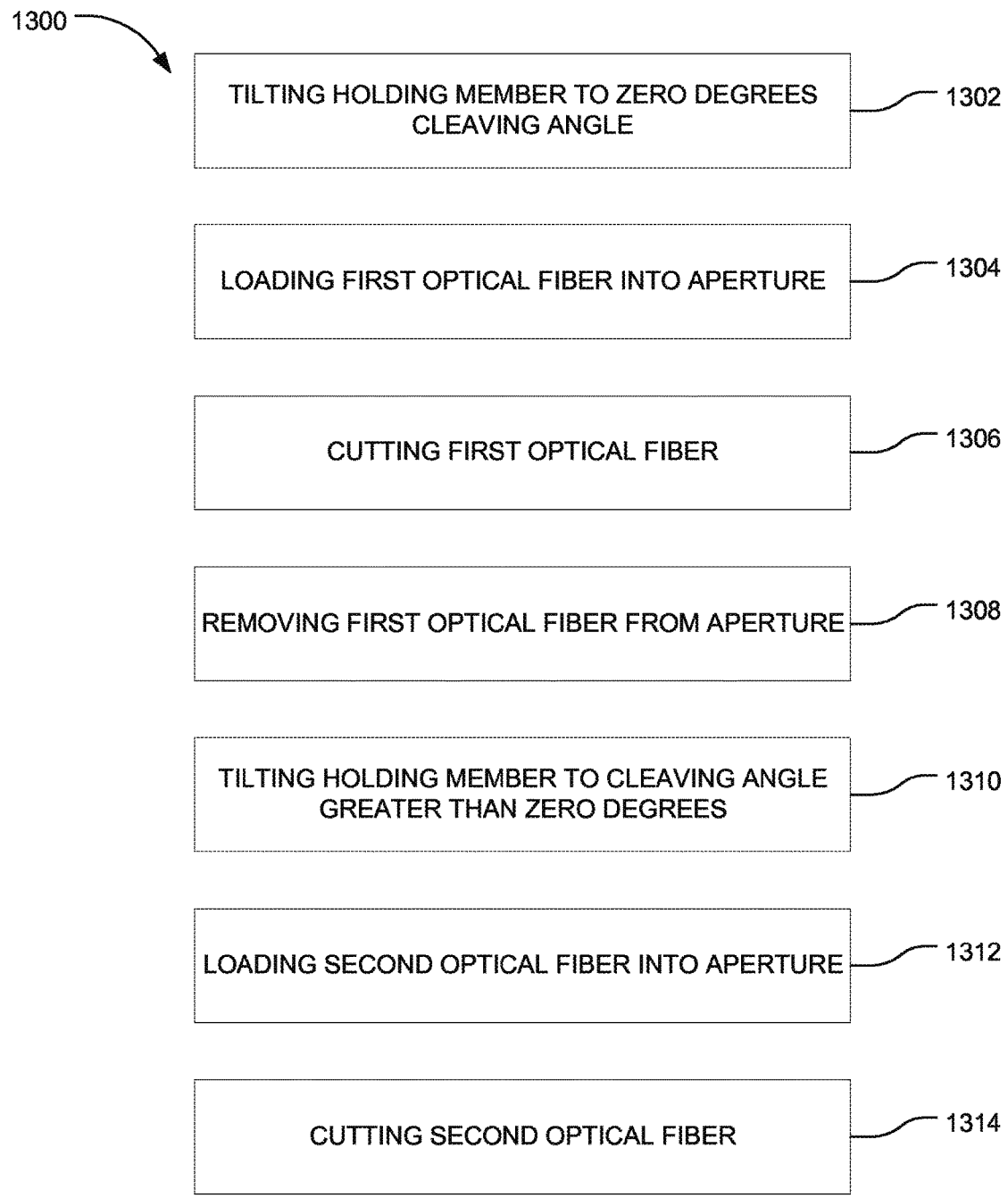
FIG. 13 is a flow diagram illustrating a method for cleaving an optical fiber.
Figure 14:
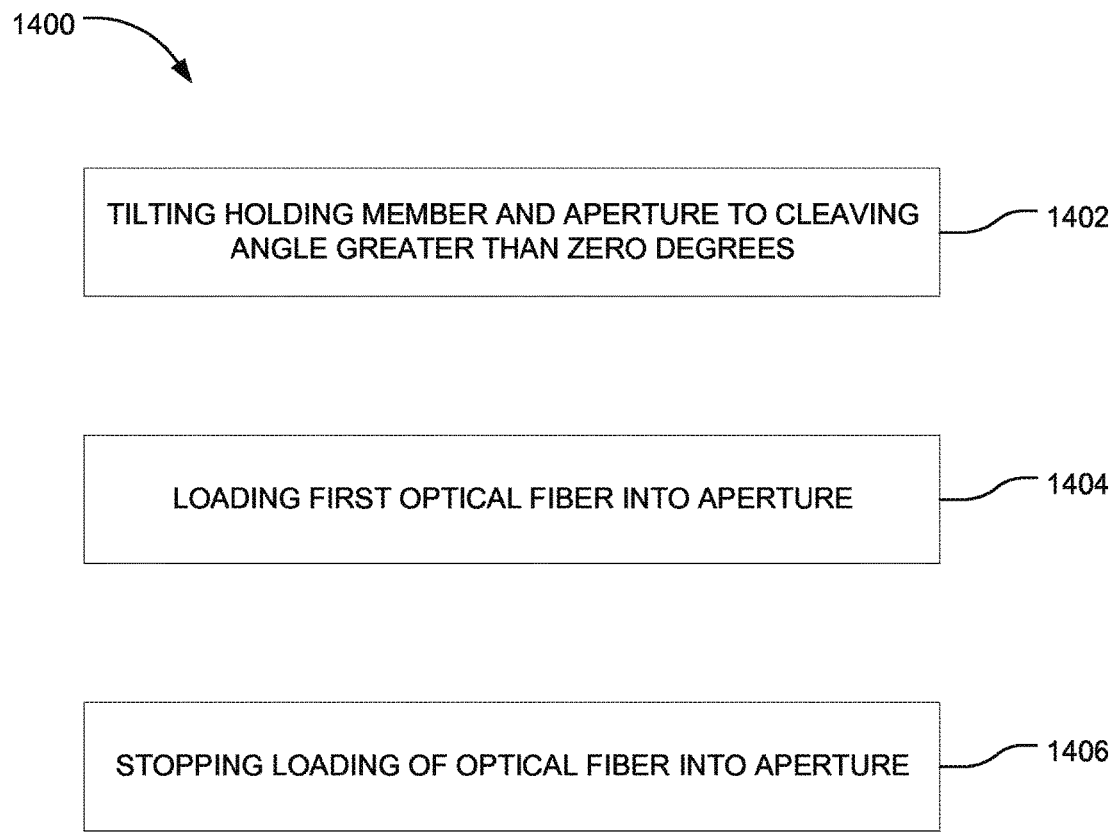
FIG. 14 is a flow diagram illustrating steps for limiting damage to an optical fiber ferrule during a method for cleaving an optical fiber.

FIGS. 12-14 are flow diagrams that illustrate various methods related to cleaving an optical fiber. Referring to FIG. 12, an example of a method 1200 for cleaving an optical fiber is depicted. The method 1200 in this example includes steps that enable an optical fiber technician to change the cleaving angle of an optical fiber laser cleaving device. Existing approaches for changing cleaving angles typically involve opening a laser cleaving device to completely remove and replace the mounting adapter with a new adapter having a different cleaving angle. Opening the laser cleaving device can expose the technician to powerful and potentially harmful laser radiation within the device. As will be seen, the cleaving method 1200 allows a technician to change the laser cleaving angle without opening the cleaving device and risking exposure to the laser.

According to the method 1200 illustrated in FIG. 12, a laser cleaving device is provided 1202 that has a housing in which is mounted a laser for cleaving an optical fiber along a cutting plane. The method includes providing 1204 an optical fiber holding system within the housing of the laser cleaving device. The holding system includes a fiber holding member that is pivotally coupled to a support structure within the laser cleaving device. Examples of fiber holding systems are described elsewhere herein, including with respect to FIGS. 2A-2D, and with respect to FIGS. 3A-11.

The holding member has a first surface that is accessible through an opening in the laser cleaving device housing. The first surface also defines an aperture that extends from the first surface to a second surface of the holding member. Returning to FIG. 12, the method 1200 includes tilting 1206 the holding member and the aperture to one of multiple cleaving angles provided by the holding system. After tilting the holding member, an optical fiber is loaded 1208 into the aperture. Once loaded in the tilted position, the method 1200 involves cutting 1210 the optical fiber with the laser. The cutting step 1210 is part of a typical cleaving process and will be familiar to those skilled in the art. Of course, after cutting/cleaving the optical fiber, the fiber is unloaded from the fiber holding system after which any further desirable processing of the fiber may be performed (e.g., polishing, connectorizing, installing, etc.).

Turning to FIG. 13, steps are illustrated for a method 1300 that involves cleaving two optical fibers. In this example, the method 1300 includes tilting 1302 a fiber holding member (such as one of those described herein) to a cleaving angle of zero degrees, which is one of multiple possible cleaving angles. Afterward, a first optical fiber is loaded 1304 into the loading slot or aperture of the fiber holding member. In some cases the first optical fiber is mounted within a ferrule having a perpendicular end face. The method 1300 then involves cutting 1306 the first optical fiber with the laser cleaving device.

After cutting 1306 the first optical fiber, the fiber is removed 1308 from the aperture. Next, the method 1300 involves tilting 1310 the holding member to a second cleaving angle. As discussed above with respect to earlier Figures, in some cases the second cleaving angle is greater than zero degrees, or possibly less than zero degrees depending on the reference system being used to measure angles. The method further involves a second optical fiber mounted within a ferrule having an angled end face. As shown in FIG. 13, the method 1300 includes loading 1312 the second optical fiber into the aperture of the fiber holding system. The second optical fiber is then cut 1314 using the laser cleaving device. Although not shown in FIG. 13, the method 1300 may also optionally include loading and cutting additional fibers at one of the same cleaving angles in steps 1302 or 1310, or a different cleaving angle as desired.

FIG. 14 illustrates steps 1400 in a method for cleaving optical fibers that may involve an incorrectly loaded optical fiber as discussed above with respect to FIGS. 8-11. For example, in the depicted steps, the method includes first tilting 1402 the fiber holding member to a cleaving angle that is greater than zero degrees (or, alternatively, less than zero degrees). Afterward, an optical fiber is loaded 1404 into the aperture of the fiber holding member. The optical fiber is optionally mounted in a ferrule having a perpendicular end face, but could also be mounted in a ferrule having an angled end face as illustrated in FIG. 11. As the optical fiber and ferrule are loaded, the method involves stopping 1406 loading of the optical fiber into the aperture before the perpendicular end face of the ferrule crosses the cutting plane. As described above, in some cases the fiber holding system includes a stop member for stopping the loading of the optical fiber. The stop member can include at least one stop surface located between the cutting plane and the second surface of the holding member.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A holding system for laser cleaving an optical fiber, the holding system comprising:
   a support structure located at least partially within a laser cleaving device, the support structure comprising an exterior surface having a first aperture formed there through;
   a holding member comprising a first surface accessible through the first aperture and a second surface opposite the first surface, the holding member defining a second aperture extending there through from the first surface to the second surface for receiving a corresponding mounted optical fiber; and
   a pivot mechanism pivotally coupling the holding member to the support structure;
   wherein the holding member is pivotable relative to the support structure and a cutting plane of the laser cleaving device to provide a plurality of cleaving angles between the cutting plane and the optical fiber;
   wherein the plurality of cleaving angles comprises a first cleaving angle that is zero degrees for cleaving a perpendicular end face of the optical fiber and a second cleaving angle other than zero degrees for cleaving an angled end face of the optical fiber;
   wherein the optical fiber is mounted within a ferrule having an end face;
   wherein the optical fiber extending from the end face of the ferrule to the cutting plane defines a cut length; and
   wherein the first cleaving angle provides a cut length with respect to the perpendicular end face that is substantially the same as a cut length provided by the second cleaving angle with respect to the angled end face.

2. A holding system for laser cleaving an optical fiber, the holding system comprising:
   a support structure located at least partially within a laser cleaving device, the support structure comprising an exterior surface having a first aperture formed there through;
   a holding member comprising a first surface accessible through the first aperture and a second surface opposite the first surface, the holding member defining a second aperture extending there through from the first surface to the second surface for receiving a corresponding mounted optical fiber;
   a pivot mechanism pivotally coupling the holding member to the support structure; and
   a pivot catch assembly comprising a first part provided by the support structure and a second part provided by the holding member;
   wherein the holding member is pivotable relative to the support structure and a cutting plane of the laser cleaving device to provide a plurality of cleaving angles between the cutting plane and the optical fiber;
   wherein the plurality of cleaving angles comprises a first cleaving angle that is zero degrees for cleaving a perpendicular end face of the optical fiber and a second cleaving angle other than zero degrees for cleaving an angled end face of the optical fiber; and
   wherein a first engagement of the first and second parts corresponds to the first cleaving angle and a second engagement of the first and the second parts corresponds to the second cleaving angle.

3. The holding system of claim 2, wherein one of the first and the second parts of the pivot catch assembly comprises recesses and the other one of the first and the second parts comprises spring-loaded elements for engaging the recesses.

4. A holding system for laser cleaving an optical fiber, the holding system comprising:
   a support structure located at least partially within a laser cleaving device, the support structure comprising an exterior surface having a first aperture formed there through;
   a holding member comprising a first surface accessible through the first aperture and a second surface opposite the first surface, the holding member defining a second aperture extending there through from the first surface to the second surface for receiving a corresponding mounted optical fiber;
   a pivot mechanism pivotally coupling the holding member to the support structure; and
   a stop member;
   wherein the holding member is pivotable relative to the support structure and a cutting plane of the laser cleaving device to provide a plurality of cleaving angles between the cutting plane and the optical fiber;

wherein the optical fiber is mounted within a ferrule corresponding to the second aperture, the ferrule having an end face from which an end of the optical fiber extends;

wherein the second aperture is configured to receive the ferrule with the ferrule extending past the second surface of the holding member to position the end face of the ferrule proximate the cutting plane;

wherein the stop member is configured to stop movement of the ferrule into the cutting plane, the stop member comprising a stop surface located between the cutting plane and the second surface of the holding member; and wherein a laser output of the laser cleaving device generates the cutting plane, and wherein the stop member comprises a blocking portion that extends from the stop surface toward the holding member and between the ferrule and the laser output.

5. A holding system for laser cleaving an optical fiber, the holding system comprising:

a support structure located at least partially within a laser cleaving device, the support structure comprising an exterior surface having a first aperture formed there through;

a holding member comprising a first surface accessible through the first aperture and a second surface opposite the first surface, the holding member defining a second aperture extending there through from the first surface to the second surface for receiving a corresponding mounted optical fiber;

a pivot mechanism pivotally coupling the holding member to the support structure; and a stop member;

wherein the holding member is pivotable relative to the support structure and a cutting plane of the laser cleaving device to provide a plurality of cleaving angles between the cutting plane and the optical fiber;

wherein the optical fiber is mounted within a ferrule corresponding to the second aperture, the ferrule having an end face from which an end of the optical fiber extends;

wherein the second aperture is configured to receive the ferrule with the ferrule extending past the second surface of the holding member to position the end face of the ferrule proximate the cutting plane;

wherein the stop member is configured to stop movement of the ferrule into the cutting plane, the stop member comprising a stop surface located between the cutting plane and the second surface of the holding member; and wherein the stop surface is a first stop surface, wherein the stop member further comprises a second stop surface, and wherein the first and the second stop surfaces engage the end face of the ferrule on opposite sides of the optical fiber.

6. The holding system of claim 5, wherein the laser cleaving device comprises a laser output that generates the cutting plane;

wherein the stop member comprises a first extension member that provides the first stop surface;

wherein the stop member comprises a second extension member that provides the second stop surface; and wherein each of the first and the second extension members comprises first ends proximal to the laser output and second ends distal to the laser output; and wherein the first extension member angles away from the ferrule from the first end of the first extension member to the second end of the first extension member; and wherein the second extension member angles away from the ferrule from the first end of the second extension member to the second end of the second extension member.

7. A holding system for laser cleaving an optical fiber, the holding system comprising:

a support structure located at least partially within a laser cleaving device, the support structure comprising an exterior surface having a first aperture formed there through;

a holding member comprising a first surface accessible through the first aperture and a second surface opposite the first surface, the holding member defining a second aperture extending there through from the first surface to the second surface for receiving a corresponding mounted optical fiber;

a pivot mechanism pivotally coupling the holding member to the support structure; and a stop member;

wherein the holding member is pivotable relative to the support structure and a cutting plane of the laser cleaving device to provide a plurality of cleaving angles between the cutting plane and the optical fiber;

wherein the optical fiber is mounted within a ferrule corresponding to the second aperture, the ferrule having an end face from which an end of the optical fiber extends;

wherein the second aperture is configured to receive the ferrule with the ferrule extending past the second surface of the holding member to position the end face of the ferrule proximate the cutting plane;

wherein the stop member is configured to stop movement of the ferrule into the cutting plane, the stop member comprising a stop surface located between the cutting plane and the second surface of the holding member;

wherein the end face of the ferrule is perpendicular to an axis of the optical fiber;

wherein the stop member allows complete loading of the ferrule within the second aperture at a first cleaving angle; and wherein the stop member stops the ferrule from being completely loaded within the second aperture at a second cleaving angle.

8. A holding system for laser cleaving an optical fiber, the holding system comprising:

a support structure located at least partially within a laser cleaving device, the support structure comprising an exterior surface having a first aperture formed there through;

a holding member comprising a first surface accessible through the first aperture and a second surface opposite the first surface, the holding member defining a second aperture extending there through from the first surface to the second surface for receiving a corresponding mounted optical fiber;

a pivot mechanism pivotally coupling the holding member to the support structure; and a stop member;

wherein the holding member is pivotable relative to the support structure and a cutting plane of the laser cleaving device to provide a plurality of cleaving angles between the cutting plane and the optical fiber;

wherein the optical fiber is mounted within a ferrule corresponding to the second aperture, the ferrule having an end face from which an end of the optical fiber extends;

wherein the second aperture is configured to receive the ferrule with the ferrule extending past the second surface of the holding member to position the end face of the ferrule proximate the cutting plane;

wherein the stop member is configured to stop movement of the ferrule into the cutting plane, the stop member comprising a stop surface located between the cutting plane and the second surface of the holding member;

wherein at least one cleaving angle is greater than zero degrees or less than zero degrees and the end face of the ferrule comprises an angled surface corresponding to the at least one cleaving angle;

wherein the stop member allows complete loading of the ferrule within the second aperture at the at least one cleaving angle if the ferrule is loaded with the angled surface parallel to the cutting plane; and wherein the stop member stops the ferrule from being completely loaded within the second aperture at the at least one cleaving angle if the ferrule is loaded with the angled surface not parallel to the cutting plane.

9. A holding system for laser cleaving an optical fiber, the holding system comprising:

a support structure located at least partially within a laser cleaving device, the support structure comprising an exterior surface having a first aperture formed there through;

a holding member comprising a first surface accessible through the first aperture and a second surface opposite the first surface, the holding member defining a second aperture extending there through from the first surface to the second surface for receiving a corresponding mounted optical fiber; and a pivot mechanism pivotally coupling the holding member to the support structure;

wherein the holding member is pivotable relative to the support structure and a cutting plane of the laser cleaving device to provide a plurality of cleaving angles between the cutting plane and the optical fiber; and wherein the support structure comprises a mounting portion fastened within the laser cleaving device, and wherein the support structure can be unfastened to remove the holding system from the laser cleaving device.

10. An optical fiber fixture for use with a laser cleaving device, the optical fiber fixture comprising:

a fixture body comprising a frame portion and a mounting portion for mounting the fixture body within a laser cleaving device comprising a housing and a cutting plane, the frame portion defining a first aperture, the mounting portion defining a void adjacent to the first aperture, and the mounting portion being removably mountable within the housing to make the frame portion accessible through an opening in the housing and to locate the cutting plane within the void; and a holding member pivotally coupled to the fixture body within the void, the holding member comprising a first surface accessible through the first aperture and a second surface opposite the first surface, the holding member defining a second aperture extending there through from the first surface to the second surface for receiving and positioning a corresponding mounted optical fiber relative to the cutting plane;

wherein the holding member is pivotable relative to the fixture body and the cutting plane to provide a plurality of cleaving angles between the cutting plane and the optical fiber, the plurality of cleaving angles comprising at least a first cleaving angle that is zero degrees and a second cleaving angle that is a non-zero cleaving angle.

11. The optical fiber fixture of claim 10, wherein the plurality of cleaving angles consists of multiple discrete cleaving angles.

12. The optical fiber fixture of claim 11, further comprising a pivot catch assembly comprising a first part provided by the fixture body and a second part provided by the holding member, wherein the first part and the second part comprise multiple engagement configurations corresponding to the multiple discrete cleaving angles.

13. The optical fiber fixture of claim 12, wherein one of the first and the second parts of the pivot catch assembly comprises recesses and the other one of the first and the second parts comprises spring-loaded elements for engaging the recesses.

14. The optical fiber fixture of claim 10, wherein the optical fiber is mounted within a ferrule corresponding to the second aperture, the ferrule having an end face from which an end of the optical fiber extends;

wherein the second aperture is configured to receive the ferrule with the ferrule extending past the second surface of the holding member to position the end face of the ferrule proximate the cutting plane; and further comprising a stop member attached to the fixture body for stopping movement of the ferrule into the cutting plane, the stop member comprising an extension member extending through the cutting plane toward the second surface of the holding member.

15. The optical fiber fixture of claim 14, wherein the extension member comprises a stop surface located between the cutting plane and the second surface of the holding member.

16. The optical fiber fixture of claim 14, wherein the end face of the ferrule is perpendicular to an axis of the optical fiber, wherein the stop member allows complete loading of the ferrule within the second aperture at the first cleaving angle; and wherein the stop member stops the ferrule from being completely loaded within the second aperture at the second cleaving angle.

* * * * *